(12) United States Patent
Mueller et al.

(10) Patent No.: US 7,791,562 B2
(45) Date of Patent: Sep. 7, 2010

(54) DISPLAY UNIT AND METHODS OF DISPLAYING AN IMAGE

(75) Inventors: Bruno Mueller, Duesseldorf (DE); William E. Bird, Winksele (BE)

(73) Assignee: 3M Innovative Properties Company, St. Paul, MN (US)

( * ) Notice: Subject to any disclaimer, the term of this patent is extended or adjusted under 35 U.S.C. 154(b) by 806 days.

(21) Appl. No.: 11/704,813

(22) Filed: Feb. 9, 2007

(65) Prior Publication Data

US 2007/0200794 A1 Aug. 30, 2007

Related U.S. Application Data

(60) Continuation of application No. 11/326,776, filed on Jan. 6, 2006, now Pat. No. 7,193,631, which is a continuation of application No. 10/291,067, filed on Nov. 8, 2002, now abandoned, which is a division of application No. 09/202,281, filed as application No. PCT/US96/09888 on Jun. 14, 1996, now Pat. No. 6,507,413.

(51) Int. Cl.
  G09G 5/02 (2006.01)
  G09G 3/00 (2006.01)
  G06T 11/40 (2006.01)
  G06K 15/00 (2006.01)
  H04N 1/50 (2006.01)
  G02B 5/20 (2006.01)
  G09F 13/00 (2006.01)
  G09F 19/12 (2006.01)
  G09F 19/14 (2006.01)
  G02B 3/10 (2006.01)
  G02B 5/00 (2006.01)
  H04N 1/56 (2006.01)

(52) U.S. Cl. .................. 345/55; 345/589; 345/592; 345/176; 358/1.9; 358/509; 358/519; 428/32.25; 428/46; 359/493; 359/582; 359/599; 359/601; 349/122; 349/138; 349/158

(58) Field of Classification Search .......... 349/104–106, 349/122–123, 138, 127–129, 158, 84; 359/267, 359/274, 277, 493, 577, 582, 599, 601, 603–605; 428/137, 187, 201–204, 32.24, 46, 32.25; 430/6–8, 14–15, 13, 20, 22; 40/165, 443
See application file for complete search history.

(56) References Cited

U.S. PATENT DOCUMENTS

| | | | |
|---|---|---|---|
| 3,957,724 A | 5/1976 | Schurb et al. | |
| 3,997,702 A | 12/1976 | Schurb et al. | |
| 4,234,907 A | 11/1980 | Daniel | |
| 4,261,649 A | 4/1981 | Richard | |
| 4,313,988 A | 2/1982 | Koshar et al. | |
| 4,358,488 A | 11/1982 | Dunklin et al. | |
| 4,507,073 A | 3/1985 | Shelton | |
| 4,519,017 A | 5/1985 | Daniel | |
| 4,567,073 A | 1/1986 | Larson et al. | |
| 4,614,667 A | 9/1986 | Larson et al. | |
| 4,673,609 A | 6/1987 | Hill | |
| 4,845,596 A | 7/1989 | Mouissie | |
| 4,885,663 A | 12/1989 | Parker | |
| 4,899,171 A | 2/1990 | Ogura | |
| 4,907,132 A | 3/1990 | Parker | |
| 4,925,705 A | 5/1990 | Hill | |
| 4,965,137 A | 10/1990 | Ruf | |
| 5,100,711 A * | 3/1992 | Satake et al. | 428/64.8 |
| 5,114,520 A | 5/1992 | Wang, Jr. et al. | |
| 5,153,105 A * | 10/1992 | Sher et al. | 430/339 |
| 5,187,765 A | 2/1993 | Muehlemann et al. | |
| 5,192,613 A | 3/1993 | Work, III et al. | |
| 5,202,190 A | 4/1993 | Kantner et al. | |
| 5,226,105 A | 7/1993 | Myers | |
| 5,253,084 A | 10/1993 | Rylander | |
| 5,258,832 A | 11/1993 | Rylander | |
| 5,264,926 A | 11/1993 | Rylander | |
| 5,290,615 A | 3/1994 | Tushaus et al. | |
| 5,396,559 A | 3/1995 | McGrew | |
| 5,432,876 A | 7/1995 | Appeldorn et al. | |
| 5,443,727 A | 8/1995 | Gagnon | |
| 5,452,113 A * | 9/1995 | Ikeno | 349/77 |
| 5,472,932 A * | 12/1995 | Fujimura et al. | 503/227 |

| | | |
|---|---|---|
| 5,525,177 A | 6/1996 | Ross |
| 5,550,346 A | 8/1996 | Andriash |
| 5,609,938 A | 3/1997 | Shields |
| 5,665,446 A | 9/1997 | Sundet |
| 5,679,435 A | 10/1997 | Andriash |
| 5,681,660 A | 10/1997 | Bull et al. |
| 5,749,994 A | 5/1998 | Sundet |
| 5,773,110 A | 6/1998 | Shields |
| 5,785,792 A | 7/1998 | Locke et al. |
| 5,858,155 A | 1/1999 | Hill et al. |
| 5,920,080 A * | 7/1999 | Jones .......................... 257/40 |
| 5,939,168 A | 8/1999 | Andriash |
| 6,001,515 A * | 12/1999 | Evans et al. .................... 430/7 |
| 6,030,687 A | 2/2000 | Andriash |
| 6,180,297 B1 * | 1/2001 | Tam et al. ..................... 430/41 |
| 6,197,494 B1 * | 3/2001 | Oberhardt ..................... 435/4 |
| 6,210,776 B1 | 4/2001 | Hill |
| 6,212,805 B1 | 4/2001 | Hill |
| 6,242,076 B1 | 6/2001 | Andriash |
| 6,254,711 B1 | 7/2001 | Bull et al. |
| 6,258,429 B1 | 7/2001 | Nelson |
| 6,267,052 B1 | 7/2001 | Hill et al. |
| 6,319,661 B1 * | 11/2001 | Shor et al. ................... 430/619 |
| 6,507,413 B1 | 1/2003 | Mueller |
| 6,604,812 B2 | 8/2003 | Askeland |
| 6,656,566 B1 | 12/2003 | Kuykendall |

FOREIGN PATENT DOCUMENTS

| | | |
|---|---|---|
| EP | 0 051 935 A2 | 5/1982 |
| EP | 0 118 638 A1 | 9/1984 |
| EP | 0 133 761 B1 | 3/1985 |
| EP | 0 170 472 B1 | 2/1986 |
| EP | 0 234 121 B1 | 9/1987 |
| EP | 0 457 544 A1 | 11/1991 |
| EP | 0 593 088 A1 | 4/1994 |
| GB | 2 279 616 | 11/1995 |
| JP | 61-093503 | 5/1986 |
| JP | 64-69397 | 3/1989 |
| JP | 5-045507 | 2/1993 |
| JP | 5-057863 | 3/1993 |
| JP | 5-111406 | 5/1993 |
| JP | 5-177999 | 7/1993 |
| JP | 7-198905 | 8/1995 |
| JP | 7-281601 | 10/1995 |
| WO | WO 94/19769 | 9/1994 |
| WO | WO 96/17263 | 6/1996 |

OTHER PUBLICATIONS

U.S. Appl. No. 09/098,702.
U.S. Appl. No. 08/838,755.
U.S. Appl. No. 09/094,896.

* cited by examiner

*Primary Examiner*—Wesner Sajous
(74) *Attorney, Agent, or Firm*—Colene H. Blank

(57) ABSTRACT

The present invention provides a method of displaying an image on a display device having first and second sides, said image including an light restricting silhouette pattern having a plurality of first transparent or translucent areas, and at least one design layer having at least one color, said at least one design layer being visible from one side of said display device and substantially less visible from the other side, said image being substantially transparent or translucent as viewed from the other side, comprising the steps:

1) providing at least a definition of said design layer to a computer;
2) generating a computerized version of said design layer with the computer;
3) outputting the computerized version of said design layer to said display device, the computerized version of said design layer being modified to subdivide said design layer into a plurality of second discrete transparent or translucent areas and other areas, and
4) displaying said modified design layer and said silhouette pattern with said first and second transparent areas being in registry.

Articles produced in accordance with the method are also described.

Printers, raster image processing methods and systems, computer graphics systems are described for producing the article.

29 Claims, 16 Drawing Sheets

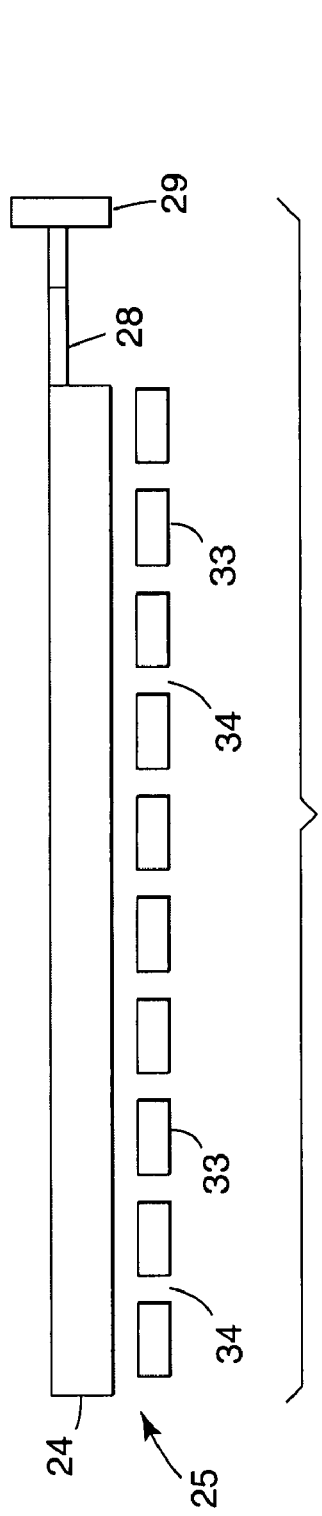
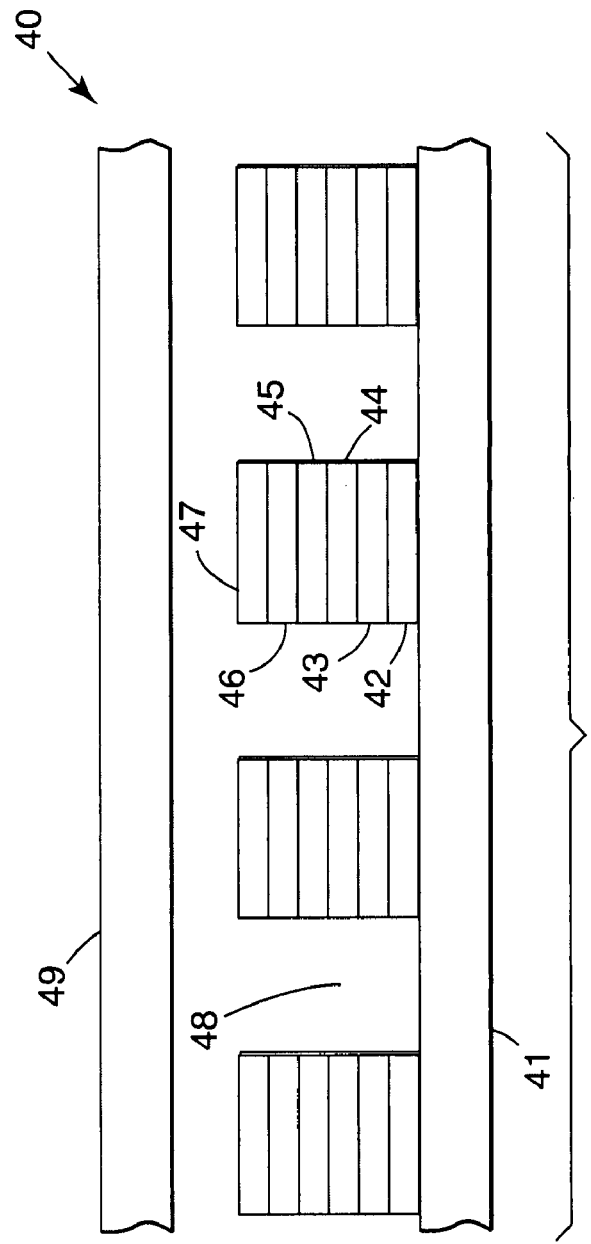

DISPLAY UNIT AND METHODS OF DISPLAYING AN IMAGE

CROSS REFERENCE TO RELATED APPLICATIONS

This application is a continuation of U.S. application Ser. No. 11/326,776, filed Jan. 6, 2006, now U.S. Pat. No. 7,193,631; which is a continuation of U.S. application Ser. No. 10/291,067, filed Nov. 8, 2002, now abandoned, which is divisional of U.S. application Ser. No. 09/202,281, filed on Dec. 11, 1998, issued as U.S. Pat. No. 6,507,413 on Jan. 14, 2003, which is a 371 of PCT/US96/09888, filed Jun. 14, 1996.

FIELD OF THE INVENTION

The present invention relates to a display unit, and in particular to a display unit for displaying images viewable from two sides, whereby the image as perceived from one side can be different from the image perceived from the other side and the display unit is transparent or translucent when viewed from one of the sides.

The invention also relates to a method of displaying such an image as well as printers suitable for displaying a printed image and raster image processing (RIP) systems for preparing the data before display, particularly before printing.

BACKGROUND OF THE INVENTION

Display devices with differing images on each side and being transparent or translucent from one of the sides are known from a variety of documents including EP-A-0170472 which describes a panel comprising a light permeable material and a silhouette pattern, comprising any arrangement of light restricting material which subdivides the panel into a plurality of discrete light restricting areas and/or a plurality of discrete transparent or translucent areas, characterized in that a design is superimposed on or forms part of said silhouette pattern so that said design is visible from one side of the panel only, and wherein said design is less perceptible from said one side of the panel as the level of illumination transmitted through the panel from said other side increases. A number of different vision effects are obtainable from different panels falling within the above definition. Thus clarity of vision can be maintained from the one side to the other side with the exception of the area covered by the design with clarity of vision through the whole of the panel from the other side to the one side. Visibility from the one side to the other side can be totally or partially obstructed while there is clarity of vision through the whole of the panel from the other side to the one side, in other words a unidirectional vision effect is obtained. Clarity of vision is obtainable from the one side to the other side except in the area of the design while visibility from the other side to the one side is totally or partially obstructed. Vision from either side can be totally or partially obstructed. In all cases through vision can be obtained in either direction through the panel when the level of illumination perceived through the panel from the far side of the panel sufficiently exceeds the illumination reflected from the near side of the panel. The transparent areas typically have dimensions ranging from 0.5 to 3 mm.

EP-A-0170472 and EP-00118638 describe methods of producing both the silhouette pattern and also the imposed design. The methods as described may be summarized as either sequential printing of the silhouette and/or the design using screen lithographic or similar ink printing processes with as exact a registration as can be obtained or a method in which a mask is applied and the printing processes are carried out through the mask onto the substrate. When the mask is removed, the silhouette pattern and image remain on the substrate only in the areas which the mask or stencil allow the ink to penetrate.

EP-A-0234121 describes further methods of printing such an image. The printing methods are limited to those including inks. Again a mask is described which is subsequently removed taking with it unwanted portions of the silhouette pattern and image.

U.S. Pat. No. 5,396,559 describes a security device for use on identification cards, monetary documents, and the like using a reference pattern and a message pattern each having the appearance of a random pattern of dots. The reference pattern is a dense pattern of randomly positioned dots, and the message pattern is a modulated version of the reference pattern in which the dots of the reference pattern are slightly repositioned by an amount depending on the gray value or color value of a message image at each dot location. The message image is decrypted and becomes visible with a range of gray values when it is viewed through a film transparency of the reference pattern. The dot pattern may be printed, embossed or recorded as a photograph or a hologram. Decryption of the message image may be accomplished by viewing through a contact mask, superposition of images of the message pattern and reference pattern, by viewing the message pattern through a mask positioned at a real image of the reference pattern, or like means.

Japanese patent application Kokai I (1993)-57863 describes a production of an image including transparent sections for areas of the image. A method is described in which a decorative sheet is prepared by registration printing in the order of a rear pattern layer, a covering ink layer and a front pattern layer on a transparent plastic sheet in such manner that a plurality of small transparent portions remain in the image. No description is made as to how the registration printing should be carried out.

Japanese patent application Kokai I (1989)-69397 describes a method of producing a transparent plastic or glass substrate with a printed layer including a plurality of holes. The method includes printing the image onto a second substrate, perforating the image and second substrate and then transferring the image only from the second substrate to the transparent plastic or glass substrate.

SUMMARY OF THE INVENTION

The present invention provides a method of displaying an image on a display device having first and second sides, said image including a light restricting silhouette pattern having a plurality of first transparent or translucent areas, and at least one design layer having at least one colour, said at least one design layer being visible from one side of said display device and substantially less visible from the other side, said image being substantially transparent or translucent as viewed from the other side, comprising the steps:

1) providing at least a definition of said design layer to a computer;

2) generating a computerized version of said design layer with the computer;

3) outputting the computerized version of said design layer to said display device, the computerized version of said design layer being modified to subdivide said design layer into a plurality of second discrete transparent or translucent areas and other areas, and 4) displaying said modified design layer and said silhouette pattern with said first and second transparent areas being in registry.

The present invention also includes an article having a conformable substrate, comprising: a colorant receptor layer and a light restricting layer on said substrate, said light restricting layer having a plurality of first transparent or translucent areas.

The present invention also includes an article comprising: a polymeric substrate having a composition comprising vinyl chloride resin, optional acrylic resin, optional plasticizer, and optional stabilizer, wherein the composition is formed on a polymeric release liner having smoothness of a Sheffield value of from about 1 to about 10, and a light restricting layer and a design layer on said substrate, said design layer including at least one color layer, said light restricting layer being subdivided into a plurality of first transparent or translucent areas, said design layer being subdivided into a plurality of second transparent or translucent areas, and said first and second transparent areas being in registry.

The present invention further includes a printer for receiving a print file including color separated image data, light restricting layer data and transparency data, and for printing the color separated image and the light restricting layer data including transparent areas in both the color-separated layer and the light restricting layer in accordance with the transparency data.

The invention further includes a raster image processing method for raster image processing of a print file including color separated image data, light restricting layer data and transparency data, comprising: operating on said print file to generate raster image bitmaps for said color separated image data and said light restricting layer data, and introducing said transparency data into said raster image bitmaps for said color separated image data and said light restricting layer data so that the transparent areas in said color separated image raster bitmap and said light restricting layer bitmap are in registry.

The invention includes in addition a raster image processing system for raster image processing of a print file including color separated image data, light restricting layer data and transparency data, comprising: means operating on said print file to generate raster image bitmaps for said color separated image data and said light restricting layer data, and means introducing said transparency data into said raster image bitmaps for said color separated image data and said light restricting layer data so that the transparent areas in said color separated image raster bitmap and said light restricting layer bitmap are in registry.

The invention also includes a graphics computer based system for creating graphics images including color separated layers and light restricting layers, comprising: first input means for image data, means for generating color separated image data from said image data, means for generating light restricting layer data, second input means for transparency data, and means for outputting a display file including said color separated image data, said light restricting layer data and said transparency data.

The present invention may provide conformable articles including transparent areas in images, methods of providing the same and printers, computer graphics systems and raster image processing systems and methods for producing images on the articles at low cost.

The present invention may provide conformable articles including transparent areas in images, methods of providing the same and printers, computer graphics systems and raster image processing systems and methods for producing images on the articles which allow variability in image not previously achieved.

The invention with its embodiments and advantages will be described with reference to the following drawings.

BRIEF DESCRIPTION OF THE DRAWINGS

FIG. 8 shows a schematic cross-section view of a third embodiment of a display unit in accordance with the present invention.

FIG. 9 is a cross-section through a printed substrate in accordance with the present invention.

DEFINITIONS

Figure 1:
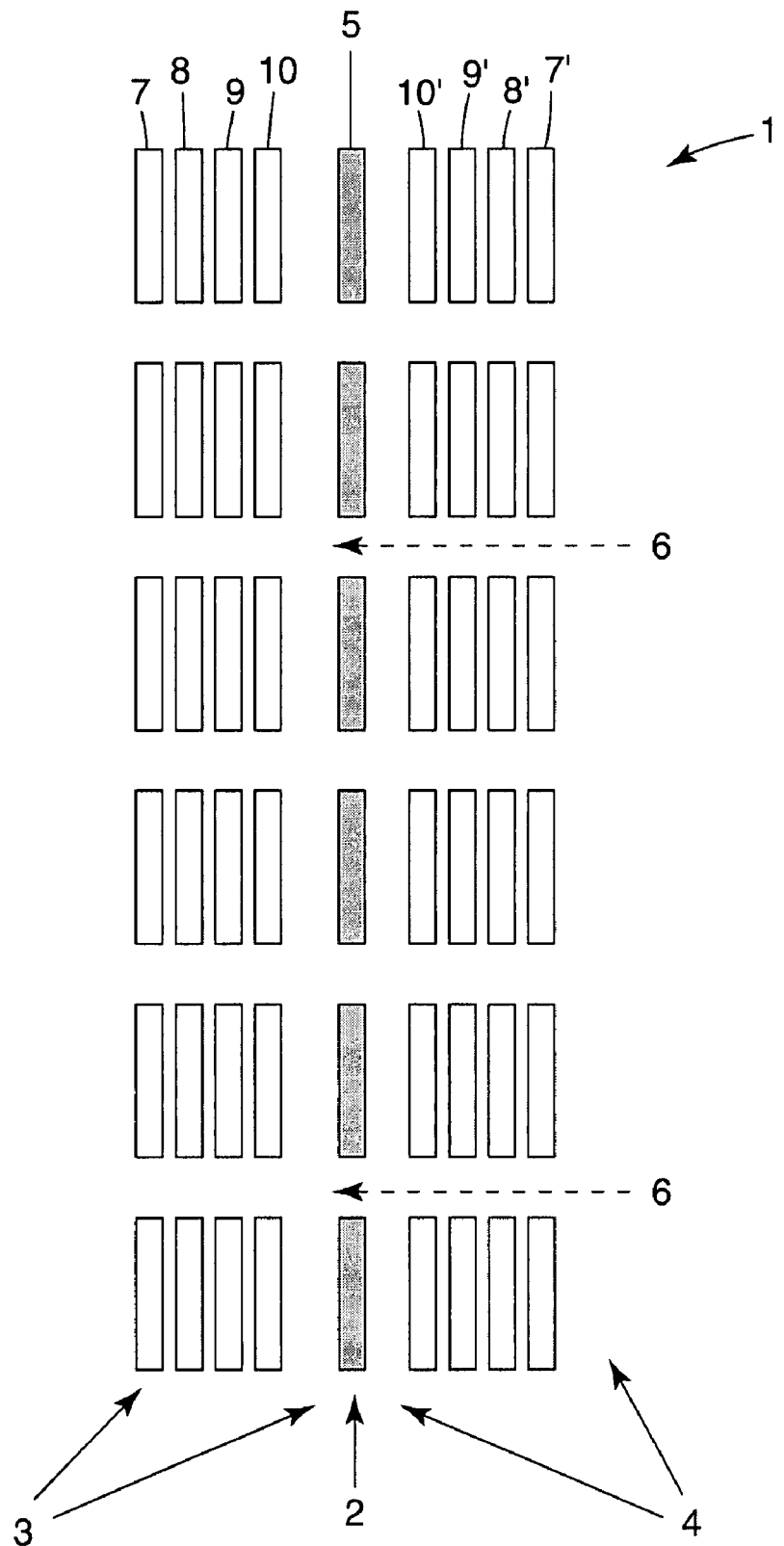
FIG. 1 shows a schematic cross section of a display unit in accordance with the present invention.

As used in this application:

"colorant" means any material that imparts color to another material or mixture and maybe either, dyes or pigments;

"colorant receptor layer" means any layer on a printing substrate which is provided for the purpose of transferring colorants to the substrate.

"durable" means the substrates used in the present invention are capable of withstanding the wear and tear associated with signage and may be 2 to 5 years in exterior environments;

"plastic" means a material that is capable of being shaped or molded with or without application of heat and include thermoplastics types, thermosets types, both of which may be flexible, semi-rigid or rigid, brittle or ductile;

"smear-resistant" as used in this application means resistant of the ink jet ink to smear as described in the following test, printing an image with black lines, allowing a minimum of five minutes time to dry, rubbing the line with the pad of the finger with a light to moderate pressure, such as might be used during normal handling of images, and observing whether spread of the line occurs;

"durable" means the substrates useful in the present invention are capable of withstanding the wear and tear associated with signage and may be used 2 to 5 years in exterior environments;

"conformable" means the substrates in a direct print film are capable of conforming to uneven surfaces and retaining such conformation during use without significant force applied per unit area of the film. Typically the conformable substrate can be adhered with hand pressure and conform to a surface having periodic or compound irregularities, such as a rivet or welded ridge on the exterior metallic surface of a tractor trailer, without the substrate lifting from the surface. Preferably, a conformable substrate in a direct print film exhibits a yield point and/or permanent strain when subjected to a maximum tensile stress of about $3.5 \times 10^7$ N/m² (5000 lb./square inch) at room temperature according to ASTM D638-94b (1994), when the caliper used for the test includes the total cross-sectional thickness of the substrate, the thickness of the adhesive, and the thicknesses of any further layers such as ink receptor, conductive or dielectric layers. More preferably, the maximum tensile stress limit is about $1.4 \times 10^7$ N/m² to provide more conformable films. Most preferably, the maximum tensile stress limit is about $7 \times 10^6$ N/m² to provide even more conformable films. Conformability of the films still require internal integrity. Desirably, the minimum tensile stress limit is about $6.9 \times 10^4$ N/m² (10 lb./square inch) and preferably the minimum tensile stress limit is about $1.7 \times 10^5$ N/m² (25 lb./square inch).

Testing Methods

Bulk Powder Resistivity: "The Application of ZELEC ECP in Static Dissipative Systems" (Du Pont Chemicals, Deepwater, N.J. September 1992)

Specific Resistance: "Tego Conduct S Resistivity Measurement and Apparatus" (available from Esprit Chemical Company, Rockland, Md.)

Surface Resistance: ASTM D 4496-87 and ASTM D 257-93 published by American Society for Testing and Materials.

Color Shift: ASTM D 2244-93 published by American Society for Testing and Materials.

Color Density: "Reflective Optical Density on a Status T Method" under the requirements of ANSI/ISO 5/3-1984, ANSI PH2. 18-1985 published by the Graphic Communications Association of Arlington, Va. Reflected optical density is measured using techniques well known to those in the printing industry. Examples herein were evaluated with a Gretag SPM50 densitometer from Gretag Limited, CH-8105 Regensdorf, Switzerland. Other instruments will give similar comparisons, but not necessarily the same values. "Color Density" is the measure of the intensity of the individual primary colors on a recording medium to form the latent image and is important to films of the present invention because color density has a major impact upon the perceived aesthetics of the image on the recording medium. By comparison, transmission optical density may be measured using an optical densitometer such as a Macbeth TD 904.

Sheffield: Sheffield method measurement described in TAPPI Test T 538 om-88 published by the Technical Association of the Pulp and Paper Industry of Atlanta, Ga.

The disclosures of the Testing Methods are incorporated herein by reference.

EMBODIMENTS OF THE INVENTION

The figures are intended for illustrative purposes only. Certain dimensions may have been exaggerated to improve clarity.

FIG. 1 shows a schematic cross section through a display unit of the kind used with the present invention. A display includes a first silhouette pattern 2, comprising an arrangement of light restricting material which subdivides the panel into a plurality of discrete light restricting areas 5 and/or a plurality of discrete transparent or translucent areas 6. The light restricting areas 5 have light transmission reducing properties. These may be, in one extreme, completely opaque, i.e. the optical density in transmission is infinite. Transmission optical density TOD (which is to be distinguished from reflection optical density, ROD) is defined by the formula:

$$TOD = \log_{10}\left(\frac{I_i}{I_t}\right),$$

where $I_i$ is the intensity of the incident light on the sample material and $I_t$ is the intensity of the transmitted light passing through the material. The present invention accepts that the light restricting layer 5 may not be perfectly opaque but may allow some light to transmit. It is preferred if the TOD of the light restricting layer is greater than 1, preferably greater than 2, more preferably greater than 2.5 and most preferably 3 or greater.

The translucent or transparent areas 6 allow light to pass through. In one extreme the transparent areas 6 transmit all light and reflect or scatter no light, i.e. a TOD of infinity and a ROD of infinity, where the optical density in reflection is given by:

$$ROD = \log_{10}\left(\frac{I_t}{I_R}\right),$$

$I_R$ being the reflected light intensity.

The present invention accepts that the translucent/transparent areas 6 may not be perfect light transmitters, i.e. they may absorb and/or reflect and/or scatter some light. It is preferred if the TOD of the transparent or translucent areas have an ROD of less than 1, preferably less than 0.5. The translucent areas 6 should differ in optical density from the light restricting areas 5 by a sufficient amount to make a clear visual difference. The TOD difference between areas 5 and 6 should preferably be greater than 0.3. According to the present invention the areas 6 are preferably transparent, more preferably optically clear.

The pattern of light restricting 5 and/or transparent/translucent areas 6 may be any array of pixels, for example, a pattern of parallel lanes, dots, circles, squares, etc. which may be arranged in a regular array, in the form of a design, in an irregular array or in a random way. The transparent areas, 6 may have any dimension depending upon the display device used, and may be diameters typically in the range of 0.1 mm to 8 mm, preferably 0.2 mm to 3 mm. The ratio of the transparent areas 6 to light restricting areas 5 may be chosen as desired but is typically 0.3 to 3, usually about 1, i.e. 50% of the surface area is covered by transparent areas 6. In accordance with the present invention the silhouette pattern 2 may be provided by any spatial light modulator or filter which comprises a plurality of discrete light restricting areas 5 and/or a plurality of discrete transparent or translucent areas 6. The spatial light modulator or filter 2 may be a silhouette pattern similar to that described in EP-A-0170472 or a pattern created by the back-light of a liquid crystal (LCD) display device or any other appropriate display device.

Substantially coextensive with the spatial light modulator or filter 2 is placed a display device 3 and/or a display device 4. Display device 3 or 4 can display an image which may be a full color image represented schematically by the four layers 7-10, 7'-10' and the image is divided into transparent or translucent areas 6 and colored design areas 7-10,7'-10' so that the transparent or translucent areas 6 of the spatial light modulator or filter 2 are aligned (in registry) with the translucent or transparent areas 6 of display device 3, 4. The display device 3 or 4 may be a printed image, for instance, in accordance with EP-A-0170472 or similar, or may be a LCD or LED display device which is capable of displaying a monochrome or full color image. At least one of display device 3 or 4 may be a black or dark colored pattern.

The display unit 1 may be self-standing or may be laminated to a substrate such as a transparent sheet of glass-like or polymeric material. The glass or polymeric sheet may be laminated to the display device 3, the display device 4 or may be interposed between any of the layers 7-10,7'-10' or between display device 3 and silhouette pattern 2 or between silhouette pattern 2 and display device 4. The substrate may be the window of a car, bus or building or may be a flexible polymeric sheet. When the display device 3 or 4 is black or a dark color and is located next to the transparent sheet 1, the dark display device 3, 4 may be partly or completely provided by tinting the transparent sheet as taught in EP Patent No. 0 133 761.

Figure 2:
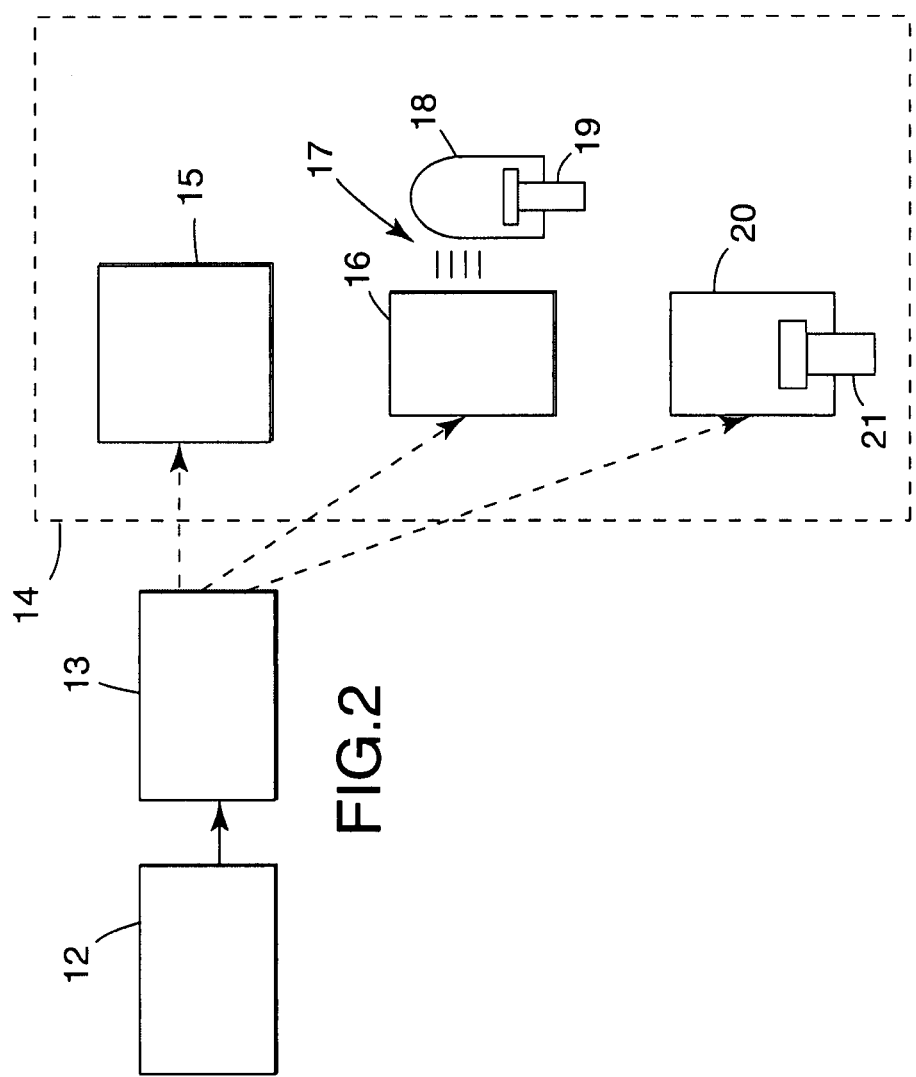
FIG. 2 shows a block diagram of a display system in accordance with the present invention.

FIG. 2 shows a schematic block diagram of the first embodiment of the present invention. A suitable graphics image for display purposes is generated in image generation means 12. The image may be generated using computer 13 and special software developed for production of graphic images such as Adobe Photoshop™, Adobe Illustrator™, Corel-Draw™, Aldus® Pagemaker™, Quark Xpress™ or similar. The image generation means 12 may be a scanner with which all or part of picture information from an image, a picture or photograph is converted point by point into electrical signals to be stored in computer 13 as digital data.

Once the graphics image has been stored in computer 13 as a matrix of digital data which include sufficient data to determine the luminosity and color of each pixel of information, the data may be prepared such that it may be displayed with a plurality of transparent areas 6 within the graphics image.

In accordance with the present invention this maybe done in several different ways:

Method 1. The color-separated layers of data (conventionally CMYK, cyan, magenta, yellow and black or if the black layer is not used: CMY) may be modified to include no color data representing the transparent areas 6 in each of the layers. This modification to the data may be done in computer 13 but the invention is not limited thereto. The pattern of transparent areas 6 may be provided by overlaying the transparent areas 6 as areas of "no-color" onto the graphics image within computer 13. The no-color data may be stored as raster or pixel data. In general there is no need to modify the half-tone algorithms as disclosed for instance in U.S. Pat. Nos. 5,253,084; 5,258,832; 5,264,926; or 4,758,886 used to create the full color image. However, if small diameters of the transparent areas are used (<0.5 mm) it may be advisable to select the size of the transparent areas 6 and their spacing so that they are not a multiple of the size of halftone cells in order to avoid rhythmic color shifts. With small size transparent areas 6, method 2 is preferred. The translucent/transparent areas 6 may be a regular, irregular, or random array of dots, lines, squares, circles, polygons, or similar, or a separate array of these representing a design or image. Both the size and the distribution of the transparent areas 6 may be varied through the image.

Figure 3A:
FIG. 3 a complex image including transparent areas in accordance with the present invention.
Figure 3B:
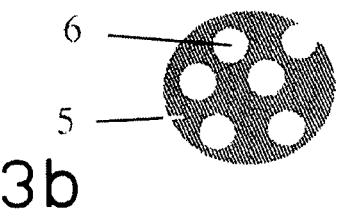

As shown in FIG. 3 the transparent areas 6 may be a complex and attractive design 5, 6, 11 which has image portions 22 which may be light restricting and a transparent design portion 23 made up of transparent/translucent areas 6 surrounded by image areas which may be light restricting areas 5. The transparent areas 6 may have differing diameters and shapes in order to represent the detail of the design correctly. It is understood that on the reverse race of the design 22, 23, a full color image 3 or 4 may be displayed. The representation of the filigree patterns of the fern leaves in a plurality of transparent areas 6 which are in registry through multiple layers of printing requires exact printing of small size repetitive transparent areas 6 separated by substantially opaque regions 5 in order to create a vivid and clear design.

Method 2. The data representing the transparent areas is stored in a separate layer—a "T" layer—in computer 13. A display output file from computer 13 includes the color separated primary printing color layers, CMYK or CMY layers, plus the T layer. As will be described later, the information in the T layer may be used in different ways. For instance, where Raster Image Processing (RIP) is carried out, the data of the T layer may be introduced into each of the CMYK layers in the final raster bitmap during or immediately after the RIP. Introducing this data into the raster bitmap has the advantages that small repetitive structure distortion may be reduced and the registration of the final, image may be improved, as each color separated bitmap has the identical positions of the transparent areas. Alternatively, the T layer may bypass the RIP and be users by a display control circuit to control the display 3,4 in such a way that the transparent areas 6 are generated. For instance, where the display device 3,4 is a printer, the transparent areas 6 may be generated by activating or deactivating the printer head during printing in accordance with the T layer data.

Figure 4A:
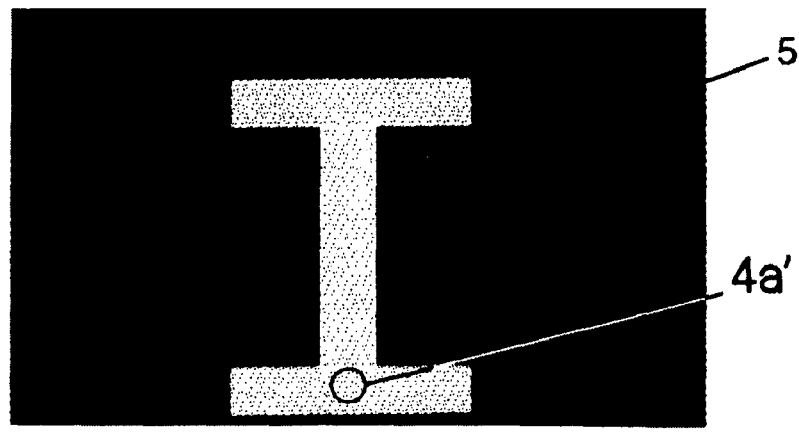
FIGS. 4A and B show characters and shapes defined by transparent areas in accordance with the present invention.
Figure 4A:
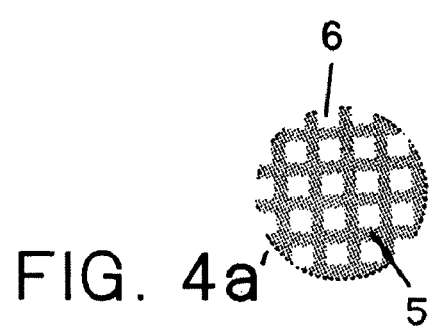
Figure 4B:
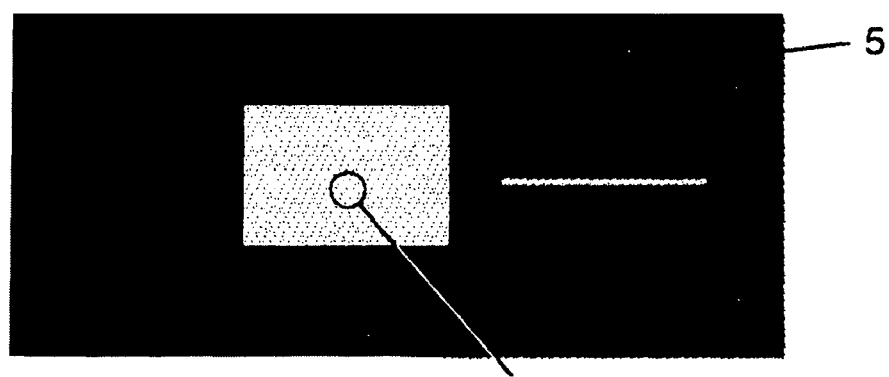
Figure 4B:
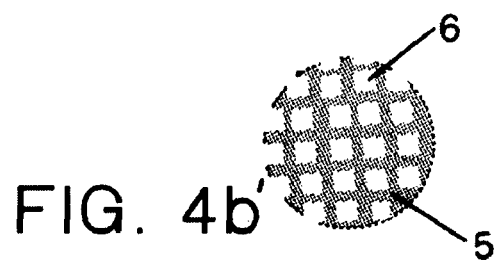

Method 3. Method 3 is a modification of method 2 and uses a separate transparent data layer T. The difference lies in the form of the data. In accordance with method 3, transparency data is stored in the same way as dot matrices are stored, except instead of a clot representing a colored dot in the final display the dot represents a transparent area 6. All the techniques of word processing and graphics software can be duplicated in the inverse: instead of colored dots on a white background, the data represents a transparent areas in a light restricting background. For instance, the data may be stored as transparent fonts. Thus a letter such as "I" is stored in the computer as a character which includes a predetermined array of transparent areas 6 as shown schematically in FIG. 4A. When in the "T" mode, i.e. when generating the data for the transparency layer T, the key stroke "I" stores the array of transparent areas 6 shown in FIG. 4A. Similarly transparency graphic programs can be used to create designs in transparent areas. Thus straight lines or shapes may be generated. Graphic elements: a rectangle and a line of transparent dots, are shown schematically in FIG. 4B.

Method 4 is a modification to method 1 in which, the silhouette layer 2 is included in addition to the CMYK or CMY layers. The silhouette layer 2 may generally be included as a light colored spot color, in particular, white. It contains the transparency data in registry with the transparency data in each of the CMY or K layers.

Method 5 is a modification of method 2 in which the silhouette layer 2 is included in addition to the CMYK or CMY layers. The silhouette layer 2 may generally be included as a light colored spot color. In preparing the silhouette layer 2 for display, the same methods (e.g. RIP) may be used a; described for the CMYK or CMY layers.

Method 6 is a modification of method 3 in which the silhouette layer 2 is included in addition to the CMYK or CMY layers. The silhouette layer 2 may generally be included as a light colored spot color. In preparing the silhouette layer 2 for display, the same methods (e.g. RIP) may be used as described for the CMYK or CMY layers.

Method 7 is a modification to method 4 in which the image of display device 4 is included in addition to the first image of display device 3 and the silhouette layer 2. The second image may generally be included as further CMYK or CMY layers. These contain the transparency data in registry with the transparency data in all of the other layers.

Method 8 is a modification of method 4 in which the image of display device 4 is included in addition to the first image of display device 3 and the silhouette layer 2. In preparing the second image 4 for display, the same methods (e.g. RIP) may be used as described for the CMYK or CMY layers of the first image 3.

Method 9 is a modification of method 6 in which the image of display device 4 is included in addition to the first image of display device 3 and the silhouette layer 2. In preparing the second image 4 for display, the same methods (e.g. RIP) may be used as described for the CMYK or CMY layers of the first image 3.

For Methods 1-9, the image is output to a display device 14 which, in accordance with the present invention, may be a direct display device similar to an LCD or LED display, an indirect printing device 16-19, or a direct printing device 20, 21.

The method of displaying the data depends upon the method of storing the data.

Methods 1, 2 and 7. As these methods have the transparency data stored in each of the layers of the CMYK or CMY data, the CMYK or CMY data can be handled as in conventional display devices provided these can display the number of layers for the particular method.

Methods 2, 3 5, 8 and 9 include a separate "T" layer, which may be processed by display devices according to the present invention. On some existing graphics software it may be possible to specify a transparent spot color or to specify a spot color of any desired color but modify the display device so that it displays this spot color as transparent. In accordance with this application, devices capable of processing data according to methods 2, 3, 5, 6, 7, 9 are called transparency layer display devices or TLD devices.

Figure 5:
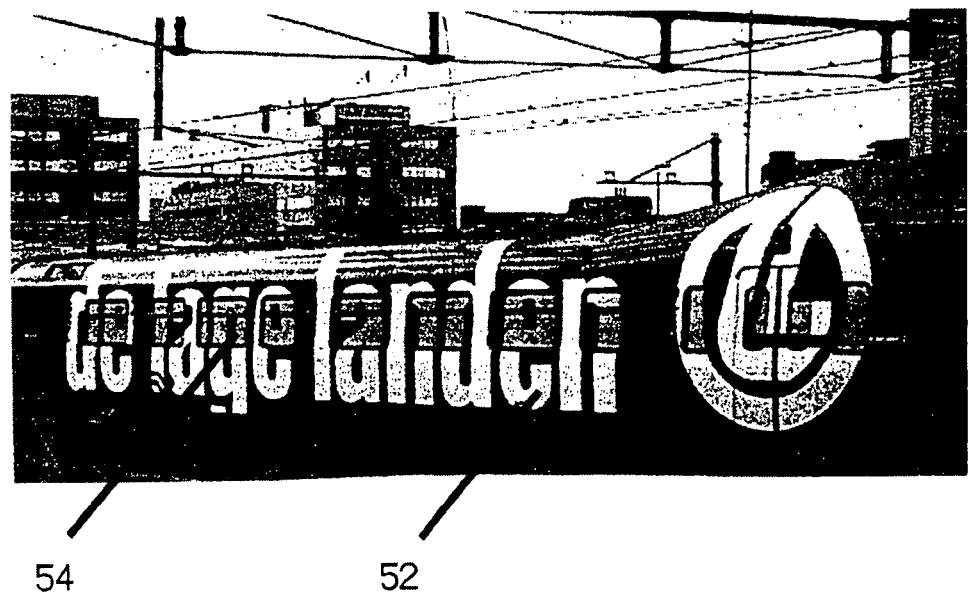
FIG. 5 the graying effect of conventional light colored window graphics as seen in the prior art.

When the display device 3 or 4 of FIG. 1 is viewed from the front and the level of illumination on that side is high, the transparent areas 6 appear dark, normally black. If the image to be displayed is simply provided with transparent areas 6 without modification to the colors of the image, this image appears uniformly darker than the original. This is particularly noticeable when the display device 3,4 is placed adjacent to the same image in which there are no transparent areas 6. This can occur when the display device 3,4 covers the window of a vehicle and the graphics continue onto the body of the vehicle. This is shown in FIG. 5 (Prior Art) which a photocopy of a photograph of a train in which large white lettering has been applied over the side of the train. The white lettering passes over windows which have been covered with conventional punched film window graphics. The gray appearance of the window areas 54 in comparison to the adjacent areas 52 on the body of the train can be clearly seen. Hue changes can also occur in the arrangement such described with respect to FIG. 3 in which full color portions 22 of the image may be adjacent to portions 23 with transparent areas 6. The following embodiment of the present invention provides a solution to this problem.

The technique of undercolor removal is known in printing and photography (see for example "The Reproduction of Color in Photography, Printing & Television", Fountain Press, UK, Second Impression 1988). Instead of printing or displaying dark areas of the image with a combination of the three traditional colors Cyan, Magenta and Yellow, using undercolor removal the black component of the color is provided separately, e.g. by using separate black toners or inks. In accordance with the present embodiment of the invention this technique is used in a novel way. When preparing the data for display, the computer graphics program of computer 13 of FIG. 2 carries out undercolor, removal in the normal way, however, the apparent dark color of the transparent areas 6 is taken into account in the undercolor removal. For example, if 50% of the image area is provided by transparent areas 6, a color with a black component of 50+X % will be displayed with only a black component of X %. The color displayed is the true color as the remaining 50% black is provided by the transparent areas 6 which appear black. For a color with less than 50% black, no black is displayed. This results in some darkening of the color with respect to the original but the total effect is still improved. To prevent differences in hue between light colored areas of the image with and without transparent areas 6, the light colored areas of the image which do not have the transparent areas 6 (e.g. outside window areas or area 22 of FIG. 3) are provided with additional black—in effect undercolor addition. With the example given above, if a color only has a 10% black component, this component is removed as completely as possible from this color in the areas of the transparent areas 6. In parts of the image without transparent areas 6, this same color has 40% black added so as to match the hues throughout the image.

It is accepted that with some of the embodiments of the present invention the display device 4 may be partly visible from the other side of the silhouette layer 2, i.e. viewed from the side of display device 3. This may be due to the fact that the silhouette layer 2 can not be produced (e.g. by some kinds of printing methods) with such opacity that the display device 4 is totally isolated optically. When display device 4 has a dark color, the result of a light restricting but not opaque silhouette layer 2 is that all the colors of display device 3 become darker. In accordance with the present invention, any darkening of the image displayed on display device 3 is also compensated for by undercolor correction, or if this is not possible, by increasing the black content of any part of the image 3 which lies outside the area where there are transparent areas 6.

A further method of compensating for the darkening effect of the transparent areas 6, is to partly metallize these areas. This has the effect of reducing transmission but provides a gain in reflected white light from the image 3. To achieve metallization, the whole area of the substrate may be partly metallized using techniques known for two way mirrors.

Figure 6:
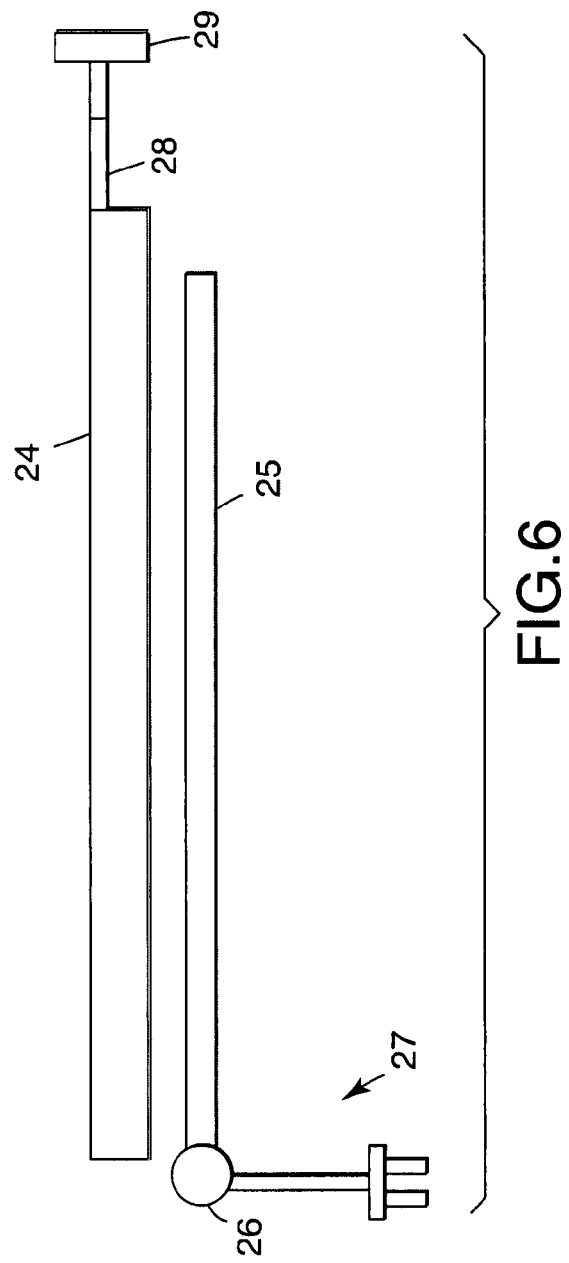
FIG. 6 shows a schematic cross-section view of a second embodiment of a display unit in accordance with the present invention.

A direct or simultaneous display device 15 in accordance with the present invention is a display device which displays at least the image directly from the electrical output of the computer 13 and combines this with the silhouette pattern 2 so that the transparent areas 6 of the silhouette layer 2 are in registry with the transparent areas of the image. Such a direct display device 15 in accordance with a second embodiment of the present invention is shown schematically in FIG. 6. A conventional LCD display 24 is addressed by an addressing unit 28 which is connected to the computer 13 in the conventional way e.g. by means of cable and connector 29. The LCD array 24 may form part of a window. Behind the LCD array 24 is placed a back-light or reflector 25 which has a light source 26 connected to a suitable power supply (not shown) by cable and connector 27.

The back-light 25 produces illumination in the form of strips, squares, circles or similar shapes separated by areas of transparent material such as to produce the silhouette pattern 2 as shown in FIG. 1. An example of such a back-light 25 is shown schematically in FIG. 7. The back-light 25 consists of a series of optical fibers 30 producing distributed light separated by transparent areas 31 which may be a transparent material such as optically clear acrylic resin. The optical fibers 30 are modified so that they distribute the light from the light source 26 and emit the light in a distributed way along their length in a direction perpendicular to the plane of the back-light 25 towards the LCD display 24. This may be done by introducing an irregularity 32 called an optical element such as a slit, on the surface of each fiber 30 away remote from the LCD display 24. Such optical fibers 30 including optical elements 32 for producing a distributed series of cones of light are described in the article entitled "Control of light output from plastic optical fiber with optical elements" by Mary Poppendieck and David Brown, published at the international Congress and Exposition of the Engineering Society for Advancing Mobility Land Sea Air and Space, Feb. 26-29, 1996.

When the optical elements 32 are arranged on the side of each optical fiber 30 which is remote from the LCD display 24 then the individual cones of light are reflected towards the LCD display 24 such as to illuminate parts, e.g. strips or rectangles of the LCD display 24. As explained in the above mentioned article, the spacing of optical elements 32 along the fiber 30 may be arranged so that the spacing of the elements 32 is closer together or intrude deeper into the fiber dependent upon the distance from the light source 26. In this way, a uniform extraction of light along the length of the fiber 30 may be achieved.

Further descriptions of how to produce a back light from optical fibers are given in U.S. Pat. Nos. 5,226,105; 4,907,132; 4,885,663; 4,845,596; 4,519,017; 4,234,907; 5,432,876; 5,187,765; and 5,005,931; all of which are incorporated herein by reference.

The LCD display 24 is driven by the computer 13 via cable and connector 29 and addressing unit 28 so that only those liquid crystal cells of LCD display 24 which are illuminated by the optical fibers 30 are addressed with data of the image 3 or 4 of FIG. 1 of the present application prepared in accordance with method 2 or 3 above. When the transparent areas are small, it is preferred if the introduction of the transparent areas in the data is delayed until immediately before display. For instance, the output data file for the image on the display device is first prepared in the computer 13. Then the transparent areas 6 are introduced. It has been found that, particularly when the transparent areas 6 are small and are in a regular array, introducing the transparent areas at an earlier stage may result in distortion of these areas, when the image is manipulated by other algorithms, e.g. filters.

The under color removal mentioned above is carried out allowing for the percentage of transparent areas 6 in the image 3,4 to be displayed. In the areas of the LCD display 24 which are opposite the transparent areas 31 of back-light 25, the computer 13 outputs the relevant data so that the LCD display 24 is transparent in these areas. Thus the image 3,4 displayed on LCD display 24 consists of areas of the image 3 or 4 illuminated by optical fibers 30 separated by transparent areas 31. When viewed from the front of the LCD display 24, a full image 3 or 4 may be seen separated by the transparent areas 6 which appear dark when the general illumination on the backside of the LCD display 24 is lower than the general illumination on the front side of the LCD display 24. On the other hand, when viewed from the back of the LCD display 24, the display device 25 has transparent areas 31 separated by opaque areas provided by the back of the optical fibers 30.

In accordance with a modification of the second embodiment the back-light 25 may be provided by a series of LED units 33 separated by transparent areas 34 as shown in FIG. 8 schematically. The LED elements 33 may be formed in lines or squares or circles or in similar shapes and are arranged so that the light emitted from the LED elements 33 is projected towards the LCD display 24. Thus the LED elements 33 illuminate those parts of LCD display 24 which contain image data fed to the LCD display 24 via connector and cable 29 and addressing unit 28 from the computer 13. The data output from the computer 13 provides transparent areas in the LCD display 24 which are in registry with the transparent areas 34 of the back-light 25 shown in FIG. 8.

Alternatively, the display device 14 in accordance with a third embodiment of the present invention may be an indirect printing device 16-19.

An indirect printing device in accordance with the present invention is a printing method with which there is sequential colorant transfer of individual color-separated images from intermediate image carriers to the printing substrate. Typically this requires a set of color-separated, i.e. single primary color, intermediate image substrates 17 which are used in printing device 18 to produce the final printed image 19. The intermediate imaged substrates 17 are produced from the computer output data in the intermediate imaging device 16. Such an indirect printing method may be for example lithographic or screen printing.

With reference to lithographic printing, the imaged substrates 17 may be a series of imaged polyester lithographic plates, suitable for lithographic printing on a printing press 18. The lithographic substrates 17 may be generated directly from the information from the computer 13 in a suitable imaging device 16. The set of lithographic substrates 17 may be used to print sequentially all or part of the image 4, silhouette pattern 2 and image 3 of FIG. 1 in accordance with the present invention. For instance, as shown schematically in FIG. 9, the image 4 may be a pattern of black 42 on a transparent sheet 41 in registry with an light restricting white silhouette pattern 43 onto which is printed in registry a full 4-color image 44-47 leaving transparent areas 48. Data preparation may be performed by any of the methods 7 to 9 above. Thus, a total of 6 plates 17 may be necessary: black, white, cyan, magenta, yellow and black. An individual plate 17 relay be used several times for each color in order to obtain sufficient depth of color or opacity of the printed layer 42-47. Where a dark tinted transparent sheet 41 is used it may be possible to omit the first black layers and use only five color layers: white, cyan, magenta, yellow and optionally black. Data preparation may then be made in accordance with any of the methods 4 to 6 above. In order to obtain good registration between the various lithographic substrates 17, they may be produced by a method described in co-pending European patent application EP 95106746.1 filed on May 4, 1995 which is incorporated herein by reference.

After preparation of the intermediate imaged substrates 17 from the image data, the final prints 19 are produced in printers 18 in the conventional way on clear films. The printing films used for all the embodiments of the present invention involving printing are conformable due to the conformable nature of the substrates selected and the conformable adhesive layer contacting one major surface of the substrate.

Figure 10:
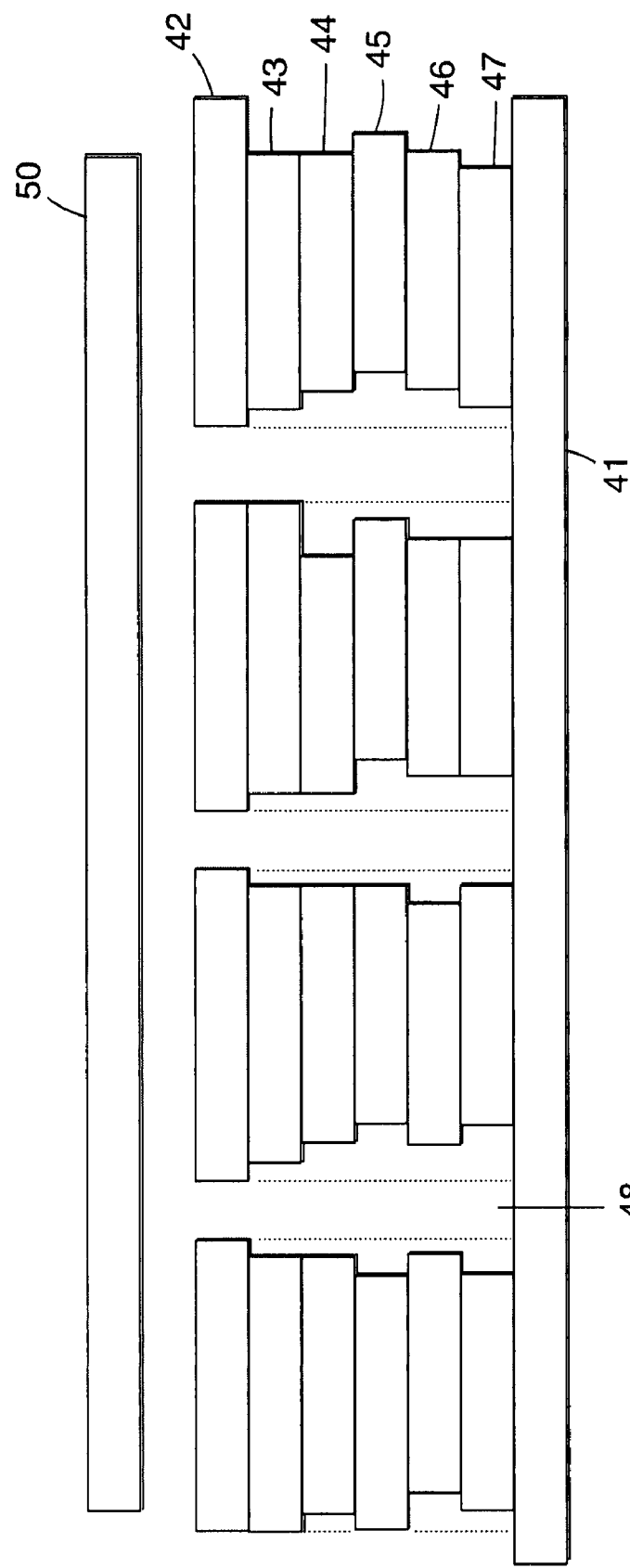
FIG. 10 is a cross-section through another printed substrate in accordance with the present invention.

An alternate sequence of color layers 42-47 may be printed as shown schematically in FIG. 10. The order of the layers 42 to 47 is reversed and the last color printed is the black layer 42. As applied to a window substrate, transparent substrate 41 may now form the outer layer or overlaminate of the sheeting 40. An adhesive layer 50 may be applied optionally to the printed side of sheeting 40 in order to secure the sheeting 40 to a window or similar. Adhesive layer 50 may be any of the adhesives mentioned below with reference to overlaminates. It is preferred if the transparent substrate 41 of FIGS. 9 and 10 is the optically clear vinyl sheeting in accordance with the eleventh embodiment of the present invention. It is also preferred if the adhesive layer 50 is optically clear, preferably an acrylic pressure sensitive adhesive.

Although it is preferable to use a pressure-sensitive adhesive, any adhesive that is particularly suited to the particular substrate selected and end-use application can be used on the sheeting 41. Such adhesives are those known in the art any may include adhesives that are aggressively tacky adhesives, pressure sensitive adhesives, repositionable and/or positionable adhesives, hot melt adhesives and the like. Pressure sensitive adhesives are generally described in Satas, Ed., *Handbook of Pressure Sensitive Adhesives* 2nd Ed. (Von Nostrand Reinhold 1989), the disclosure of which is incorporated by reference.

Also, as indicated in FIG. 10, any errors in registration between the printed layers 42-47 may be compensated for by making the transparent areas 48 in the silhouette patterns i.e. the white layer 43, slightly smaller than in the colored layers 44 to 47. Similarly, the transparent areas 48 in the black layer 42 may be made slightly smaller than the areas 48 in the white layer 43. By this means, missregistration of the colored layers will not encroach into the transparent area 48, similarly missregistration of the white layer 43 will also not encroach into the transparent areas 48 of black layer 42.

The intermediate imaged substrates 17 may also be a set of screens for a screen printing device 18. The output from computer 13 is then fed to an automatic screen producing device 16 as is known to a skilled person in screen printing techniques. The final image 19 is produced by sequential printing of the colors using the screens 17 and conventional screen printing techniques.

A major disadvantage with indirect printing methods is that the intermediate imaged substrates 17 are located in a printing device 18 in sequence and the maintenance of exact registration between the various layers of images 3 and 4 and silhouette pattern 2 of FIG. 1 is difficult or requires time consuming proofing and adjustment. Some improvement may be obtained by using a full color laser printer. In this case the intermediate imaged substrates 17 are provided by the imaged semi-conductive drums used to print substrates 19 by means of the attraction of toner to the charged electrostatic areas of the drum. Providing six or more drums requires a special printer which is expensive, or in the alternative, using the same drum six times may make exact registration difficult. The AGFA Chromapress™ electrostatic printing system supplied by AGFA-Gevaert NV, Mortsel Belgium, may be an indirect printer in accordance with the present invention. The system includes 8 electrostatic printer drums arranged as a series of four drums on each side of the substrate to be printed. The printing drums are controlled by a computer graphics system suitable for producing the modified images in accordance with the present invention. This system is designed for printing onto paper but could be modified to print onto clear films, especially optically clear polyester films of the type known for overhead transparencies.

It is preferred in accordance with fourth to sixteenth embodiments of the method of the present invention if the display device 14 is a direct printing device 20. In accordance with the present invention a direct printing device is capable of deposition of colorants of a full color image directly to a single printing substrate. The printing substrate may be the final printed article or an intermediate substrate. Hence a direct printing method is one which does not make use of a set of intermediate imaged substrates 17 which must be used in sequence in order to print a substrate 19 in a printer 18. A direct printing device 20 in accordance with the present invention is able to convert the signals from the computer 13 into a full color image on a substrate 21 or a single intermediate substrate used for transferring the image, e.g. a decal, in order to produce, for example, the sheeting 40 shown schematically in FIG. 9 or 10.

Such direct printing methods may include but are not limited to, ink-jet including bubble jet and spark jet, thermal and piezoelectric impulse jet, thermal transfer including sublimation or mass thermal transfer or electrostatic or electrophotographic printing methods. In accordance with the present invention a direct printing method may also be the electrostatic transfer method known as ScotchPrint™ Electronic Graphics System available from Minnesota Mining and Manufacturing Company in which an electrostatic image is, first created on special electrostatic paper and then is transferred in a single operation to a transparent substrate 21. The distinction between the ScotchPrint™ process described above and the indirect printing methods such as screen printing or lithographic printing is that the transfer of the image is carried out with a single substrate and is in full color whereas the indirect printing methods make use of a set of color separated imaged substrates 17 in order to generate a full color image. The registration of electrostatic printing may be considerably better than that of an indirect printer method, independent of whether the transfer process is used.

An example of a printing process used in the present invention comprises feeding the material 41 in either sheet form or dispensed from a roll into a printer, printing a desired color image and silhouette pattern 42-47 in accordance with the present invention, retrieving the image from the printer and, optionally, overlaminating the image with a film 50 to protect the receptor coatings and image from water scratching and other potential sources of damage to the image, and then removing the release liner, and affixing the printed image to a transparent substrate for viewing.

It is preferred if the direct printing method has good local registration. An example of good local registration printing is that produced by a conventional high quality ink-jet printer which prints relatively local areas of full color. Thus, very high quality registration can be obtained locally on the receptor medium. As very high definition is required around each small transparent urea in the image, good local registration may be advantageous and some distortion of the complete image over long distances may be tolerated. On the other hand, electrostatic printers have distances of several centimeters between each color station so that full color printing is not carried out as locally as ink jet printers, even with single pass machines.

Many factors may affect the local registration of printing. Ink jet printers move the substrate a distance of 2-3 mm between colors, whereas a single pass electrostatic printer moves the substrate between 100 and 150 mm and a thermal transfer printer such as the Summagraphics Summachrome™ Imaging system prints the whole area before changing color. Tests have indicated that the amount of movement between color changes is not a reliable guide to the degree of local registration.

Printers are often characterized by "dots per inch" or DPI. Tests have indicated that DPI is a better guide but not an infallible one for the choice of printer in accordance with the present invention as can be seen from Table 1 below.

Warp or distortion or thermal expansion/contraction of the substrate 21 or of intermediate substrates 17 may also affect or reduce the theoretical level of local registration.

It has been determined that the degree of local registration can be determined practically by printing a special test image which includes a special full color image with a regular array of transparent circles of different diameters in the image. When the diameter of a transparent area drops below a certain value the errors in printing registration are such that individual transparent areas are reduced significantly in diameter.

The special test image is preferably constructed of all the layers to be printed and each layer being printed at 100% color. Each layer includes the pattern of transparent circles with decreasing diameter in registration with every other layer. As an example, layers of the colors black, white, magenta, yellow, cyan and black are printed at 100% color intensity sequentially, each layer including the array of transparent circles. As the colors are at 100%, any missregistration will be easily visible as the respective color encroaching into the transparent areas and reducing their diameters.

In accordance with the present application, the "local registration index" (LRI) of the printing method/printer involved, is defined as the transparent area diameter in mm at which the diameter of a substantial number of the transparent areas in the printed image has reduced to 50% of its intended diameter in any direction. Typical values are given in Table 1 for some commercial printers. Actual values of LRI depend on the accuracy of setting up the printer and of calibration. It is advantageous if the printer in accordance with the present invention has a local registration index (LRI) better than (i.e. less than) 1.0 mm and preferably less than 0.6 mm and more preferably about 0.3 mm when printing 4 or more colors.

TABLE 1

| Printer | Type | LRI (mm) | print quality | DPI |
|---|---|---|---|---|
| Encad Novajet | Thermal Ink jet | 0.6 | excellent | 360 |
| SummaChrome ™, Summagraphics Corp. | Thermal transfer | ~0.4* | excellent | 406 |

TABLE 1-continued

| Printer | Type | LRI (mm) | print quality | DPI |
|---|---|---|---|---|
| DesignJet ™ HP750C Hewlet Packard Corp. | Thermal Ink jet | ~0.4* | excellent | 360 |
| Xerox 8954 | Electrostatic multipass | 0.7 | good | 200 |
| 3M ScotchPrint ™ 9512 | Electrostatic, one pass | 0.6 | good | 400 |
| Raster Graphics Inc. DCS 5400 | Electrostatic, multi-pass | 1.0 | good | 200 |

*The quality of printing was very good that it was difficult to determine the limit due to extraneous effects probably introduced by the graphics software.

Generally, the silhouette pattern 2 includes an light restricting light colored or white layer or metallic silvery or gold layer which faces the display device 3 and/or the display device 4 of FIG. 1. In accordance with the present invention, this light restricting light colored layer 2 may be printed using light colored, silver metallic or white ink or toner depending on the printing method used. A white spot color is preferred. "Light restricting" means that the deposited layer has a transmission optical density (TOD) of at least 1.0, preferably of at least 2.0, more preferably of 2.5 and most preferably of 3.0 or greater. The software required for computer graphics using computer 13 in accordance with the present invention is modified so that areas of white are printed with the white toner or ink as a spot color, whereas the transparent areas are "printed" as "no ink" areas.

To prepare the data for the graphics design, the image 3,4 may be first created and stored in computer 13 including data for a light restricting layer 43. Under-color removal in accordance with the invention may be carried out on the image data as described above. The image is normally stored as color separated layers or planes of data for each primary printing color. Each of the planes represents the data for one color, e.g. black, cyan, magenta or yellow or a spot color. With conventional equipment, data preparation method 7 is used and the following is created: a 100% black or dark colored plane of data representing layer 42 as the first image 4 within the graphics software. This may be created as a spot color layer. Next, a 100% white, silver or light colored plane of data representing light colored layer 43 as the light restricting layer 2 is produced. Finally, the data for layers 44-47 as the full color graphics image 3 is generated. The black and white layers 42, 43 are preferably specified as spot colors. This results typically in producing 6 sets or planes of data: one for the black layer 42, one for the white layer 43 and four for layers 44-47 of magenta, yellow, cyan and black used for a full-color print. However, the invention is not limited thereto. Where a good quality process black may be produced, i.e. a black from a mixture of cyan, magenta and yellow, the final black layer 47 may be omitted. Where a tinted substrate is used the first black or dark layer 42 may be omitted. One or more of the layers 42-47 may be applied as a plurality of layers. For instance, the white layer 43 may be stored as a series of planes of data representing white layer 43 in order to obtain sufficient opacity in the final print.

The array of transparent areas 48 may be generated within computer 13 and the image data modified by introducing the transparent areas 48 into each of the layers of data representing the printed layers 42-47 by overlaying or other technique. Typically for printing devices 16-21, "EPS" Separation files are constructed from the modified image including the transparent areas 48 and these files are communicated to the relevant intermediate imaging device 16 or printer 20. Alternatively and preferably, the introduction of the transparent areas 48 into the data to be printed is delayed to the last possible step before creation of the intermediate imaging substrates 17 or printing to form printed images 21. This is best achieved using data preparation methods 5, 6, 8, or 9 in which a separate T layer is output from the computer 13. The T layer data is introduced into the CMYK layer data and the silhouette layer data when the output data from the computer 13 is raster image processed into raster bitmaps of the various print layers 42-47. This has the advantage that operating on the data with algorithms, e.g. to prepare print files, change scale, change from Macintosh format to DOS format, is carried out before small scale repetitive structures such as the transparent areas 48 are introduced into the image data. Due to truncation errors, small scale repetitive structures in digital data may suffer distortions when operated on by algorithms. Such distortions may appear as rhythmic changes of size or shape or loss of part of the image.

To protect the printing, a transparent overlaminate 49 may be used which is preferably optically clear. It is preferred if the overlaminate 49 is the optically clear sheeting in accordance with the eleventh embodiment of the present invention.

In this application, overlaminate layer 49 refers to any clear material that can be adhered to the surface of any existing coated or uncoated sheet material. "Overlamination" refers to any process of achieving tills adherence, particularly without the entrapment of air bubbles, creases or other defects that might spoil the appearance of the finished article or image.

The deleterious effects of ambient humidity may be slowed by the overlamination of a transparent protective coat or sheet therein referred to as an overlaminate. Overlamination has the further advantage that the images are protected from scratching, splashes, and the overlaminate can supply a high gloss finish or other desired surface finish or design, and provide a degree of desired optical dot-gain. The overlaminate layer 49 may also absorb ultraviolet radiation or protect the underlayers and image from deleterious effects of direct sunlight or other sources of radiations. Overlamination is, for example, described in U.S. Pat. No. 4,966,804.

After printing an image or design of the present invention, the image is preferably overlaminated with a transparent colorless or nearly colorless material 49. Suitable overlaminate layers 49 include any suitable transparent plastic material bearing on one surface an adhesive. The adhesive of the overlaminate layer 49 could be a hot-melt or other thermal adhesive or a pressure-sensitive adhesive. The surface of the overlaminate layer 49 can provide high gloss or matte or other surface texture. Preferred overlaminate layers 49 are designed for external graphics applications and include materials such as those commercially available from 3M Company as Scotchprint™ 8910 Exterior Protective Film, 8911 Exterior Protective Film, and 8912 Exterior Protective Film. However, other films are available or could be fabricated and the invention is not limited to those exemplified.

In the absence of the use of a clear, transparent overlaminate, a protective clear coat of a vinyl/acrylic material may be applied, such as Product Nos. 3920, 8920, 9720, 66201, and 2120 protective coatings from the Commercial Graphics Division of Minnesota Mining, and Manufacturing Co. of St. Paul, USA to protect the durable, imaged substrate. Such coating may be performed by some printers at the end of the image printing process.

Pressure sensitive adhesives useful for layer 41 can be any conventional pressure sensitive adhesive that adheres to both layer 41 and to the surface of the item upon which the sheeting 40 having the permanent, accurate image is destined to be placed. Pressure sensitive adhesives are generally described in Satas, Ed., *Handbook of Pressure Sensitive Adhesives* 2nd Ed. (Von Nostrand Reinhold 1989), the disclosure of which is incorporated by reference. Pressure sensitive adhesives are commercially available from a number of sources. Particularly preferred are acrylate pressure sensitive adhesives commercially available from Minnesota Mining and Manufacturing Company of St. Paul, Minn. and generally described in U.S. Pat. Nos. 5,141,790, 4,605,592, 5,045,386, and 5,229,207.

Non-limiting further examples of pressure sensitive adhesives useful with the present invention include those adhesives described in U.S. Pat. No. Re. 24,906 (Ulrich); U.S. Pat. Nos. 2,973,826; Re. 33,353; 3,389,827; 4,112,213; 4,310,509; 4,323,557; 4,732,808, 4,917,929; and 5,296,277 (Wilson et al.) and European Publication 0 051 935, the disclosures of which are incorporated by reference herein. A presently preferred adhesive is an acrylate copolymer pressure sensitive adhesive formed from a 90/10 weight percent monomer ratio of 2-methylbutyl acrylate/acrylic acid in a 65/35 heptane/acetone solvent system (39-41% solids) and having an inherent viscosity of about 0.7-0.85 dl/g.

Thickness of adhesive 318 can range from about 0.012 mm to about 1 mm with a thickness of about 0.025 mm (1 mil) being preferred.

The adhesive may be protected with an optional liner (not shown) which can be constructed from any conventional release liner known to those skilled in the art for image graphic media. Non-limiting examples include Polyslik™ release liners commercially available from Rexam Release of Oak Brook, Ill. and polyester liners such as a 0.096 mm polyethylene terephthalate film with a matte backside coatings on one major surface and on the other major surface, a vanadium oxide/surfactant/sulfopolyester antistatic primer coating and a condensation cure silicone exterior coating. These antistatic coatings are generally described in U.S. Pat. No. 5,427,835 (Morrison et al.), the disclosure of which is incorporated by reference herein. Ideally the liner is optically flat. The liner preferably has a Sheffield value between 1 and 10.

Non-limiting examples of further release liners include silicone coated Kraft paper, silicone coated polyethylene coated paper, silicone coated or non-coated polymeric materials such as polyethylene or polypropylene, as well as the polymeric materials coated with polymeric release agents such as silicone urea, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by reference herein.

In accordance with the present invention the transparent areas in the printing may be introduced after the RIP. The printer 20 or the intermediate imaging device 16 may be a "TLD" device configured to introduce the transparent areas of the image. For instance when printer 20 is an inkjet printer, the printer may be configured so that no printing is carried out for the whole width of a printing substrate at regular intervals. This produces a series of parallel transparent areas. Alternatively the printing head may be deactivated a repeated number of times to produce a distribution of square or rectangular transparent areas. If the printer 20 is an electrostatic printer, portions of each printing head may be missing or deactivated, which produces a series of longitudinal transparent areas. Portions of the heads may be deactivated in sequence to introduce square or rectangular transparent areas.

A TLD printer in accordance with the present invention may be created by control of the printer 20 using the T layer data. After raster image processing, the raster bit maps may be operated on by a further algorithm using the T layer data which changes the raster bit map such that transparent areas are produced when printed. Such a modification may be done by a hard-wired circuit in the printer 20 or by software run on a local processor in printer 20. Alternatively, the T layer data may be used to control the printing head directly. For instance, for an ink jet printer the print signals going to the printing head may be suppressed in accordance with the T layer data to produce transparent areas at the required positions.

In accordance with the fourth embodiment of the present invention the silhouette pattern 2 and images 3 or 4 are printed using ink-jet or bubble jet printing methods. Ink jet printing includes a variety of procedures including thermal ink-jet printing and piezo-electric ink-jet printing. All the methods have in common that discrete quantities of ink are sprayed from fine nozzles towards a receptor sheet. Recently, wide format printers have become commercially available, and therefore the printing of larger articles such as large engineering drawings, blueprints and color posters and signs has become feasibly. Suitable receptor sheeting for non-durable use may be transparent polyester marking film 8501/8501H, supplied by Minnesota Mining and Manufacturing Company. The optically clear, flexible vinyl substrate in accordance with the eleventh embodiment is particularly preferred. The formation of accurate inkjet images is provided by a variety of commercially available printing techniques. A suitable large format printer, including warranted clear films and inks is the Hewlett Packard HP Design Jet 750C or 755CM printer, supplied by Hewlett Packard Corporation of Palo Alto, Calif., USA, however, may other brands are available. Non-limiting examples include thermal inkjet printers such as DeskJet brand, PaintJet brand, Deskwriter brand, DesignJet brand, and other printers commercially available from Hewlett Packard Corporation as well as piezo type inkjet printers such as those from Seiko-Epson, spray jet printers and continuous inkjet printers. To perform the invention, additional cartridges should be added to the printing head in addition to the usual four colors, cyan, magenta, yellow and black. To print a black layer 42 and a white layer 43 of FIG. 9 or 10, at least an additional white station and black station are required. To obtain good opacity two or more white or black cartridges may be added to the printing head.

From the test results shown in Table 1, it can be seen that ink jet printing provides highly accurate local registration printing. Pigmented ink jet printing, inks are available from the Commercial Graphics Division of Minnesota Mining and Manufacturing Company (3M). Generally, pigmented ink jet inks from 3M a water-based pigmented ink which comprises a suspension of commercially available pigment particles and a dispersant of a formula of

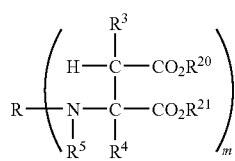

wherein R is an alkyl, aryl, or aralkyl group obtained by the removal of primary amino groups from alkyl, aryl, or aralkyl amines;

$m=1$ to 6;

$R^3$ and $R^4$ are hydrogen or lower alkyl;

$R^5$ is the residue of the nitrogen reactive compound selected from the group consisting of acylating reagents, carbamoyl halides, sulfamoyl halides, alkylating reagents, alkylating (epoxide) reagents, iso(thio)cyanates, sulfonating reagents, and azlactone reagents;

wherein $R^{20}$ and $R^{21}$ are independently, alkyl, aryl, or aralkyl groups, or a cation selected from the group consisting of a proton, lithium, sodium, potassium, ammonium, or tetraalkyl ammonium.

Pigments for ink jet inks use the standard colors of cyan, magenta, yellow, and black.

For black inks, carbon black can be used as the black pigment. The selection of carbon blacks suitable for use with the present invention is based primarily upon considerations of surface oxidation (high "volatiles" preferred), and the degree of blackness (also called jetness) of the pigment. Pigments that are acidic or surface-treated provide suitable interaction sites for strong dispersant adsorption. Pigments having a high surface oxide content are more hydrophilic, and thereby much easier to disperse. Pigments with a high degree of blackness or jetness provide a high quality printed image.

For yellow inks, the use of nickel azo yellow pigment offers several advantages. First, such pigments provide inks which are highly durable in outdoor environments. Second, such pigments contain nickel ions which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink thereby allowing proper bubble formation. For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, (i.e., lightfastness, durability, etc.), apply as well. As a variety of satisfactory properties may be found using copper phthalocyanine as a cyan pigment, inks comprising such pigments are one preferred embodiment.

Preferably, pigmented ink jet inks can be prepared with dispersants of the following formula.

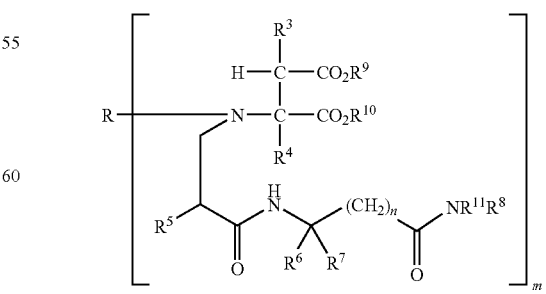

Specific compositions of suitable dispersants are given in the Table below.

| Ex | R* | $R^3$ | $R^4$ | $R^5$ | $R^6$ | $R^7$ | $R^8$ | $R^9$ | $R^{10}$ | $R^{11}$ | n |
|---|---|---|---|---|---|---|---|---|---|---|---|
| a | R | H | H | H | $CH_3$ | $CH_3$ | $C_4H_9$ | Na | Na | H | 20 |
| b | R | H | H | H | $CH_3$ | $CH_3$ | $C_8H_{17}$ | Na | Na | H | 20 |
| c | R | H | H | H | $CH_3$ | $CH_3$ | $C_{12}H_{25}$ | Na | Na | H | 20 |
| d | R | H | H | H | $CH_3$ | $CH_3$ | $C_{18}H_{37}$ | Na | Na | H | 20 |
| e | R | H | H | H | $CH_3$ | $CH_3$ | $CH_2CH_2C_6H_5$ | Na | Na | H | 20 |
| f | $C_6H_5CH_2CH_2$ | H | H | H | $CH_3$ | $CH_3$ | $C_4H_9$ | Na | Na | H | 10 |
| g | $N(CH_2CH_2)_3$ | H | H | H | $CH_3$ | $CH_3$ | $C_4H_9$ | Na | Na | H | 30 |
| h | R | H | H | H | $CH_3$ | $CH_3$ | R** | $C_2H_5$ | $C_2H_5$ | H | 20 |
| j | R | H | H | H | $CH_3$ | $CH_3$ | R*** | $C_2H_5$ | $C_2H_5$ | H | 20 |

*The aspartic ester used in the preparation of the dispersant of examples a-e, h and j was Desmophen ™ XP 7059E, available from the Bayer Corporation, Pittsburgh, PA. Desmophen ™ XP 7059E contains a short chain alkyl group.
**The amine used in the ring opening reaction to prepare dispersant of Example h was Jeffamine ™ M-600 [O-(2-aminopropyl)-O'-(methoxyethyl)polypropylene glycol 500] (available from Fluka Chemical Corp. Ronkonkoma, NY).
***The amine used in the ring opening reaction to prepare dispersant of Example j was Jeffamine ™ M-1000 [O-(2-aminopropyl)-O'-(2-methoxyethyl)copoly(ethylene, propylene glycol 900] (available from Fluka Chemical Corp. Ronkonkoma, NY).

In the practice and the field of the fifth embodiment, the groups which are not directly involved in the reaction steps forming the compounds of the present invention may be substituted to meet desired physical property requirements in the final dispersants. This is not only allowable, but may be highly desirable or essential in the formation of tailored dispersants. Where individual substituents may tolerate such broad substitution, they are referred to as groups. For example, the term "alkyl group" may allow for ester linkages or ether linkages, unsubstituted alkyls, alkyls with such useful substitution as halogen, cyano, carboxylic ester, sulfonate esters or salts, and the like. Where the term "alkyl" or "alkyl moiety" is used, that term would include only unsubstituted alkyls such as methyl, ethyl, propyl, butyl, cyclohexyl, isooctyl, dodecyl, etc.

In addition to the pigments and dispersants described above, the inks will comprise primarily water as a pigment suspension agent. Such inks will typically also include further additives to provide various properties. For example, an alcoholic polyol, may be employed to control the drying rate of the ink. Suitable alcoholic polyols include, for example, polyalkylene glycols such as polyethylene glycol and polypropylene glycol; alkylene glycols whose alkylene group has 2-6 carbon atoms, such as ethylene glycol, propylene glycol, butylene glycol, triethylene glycol, 1,2,6-hexanetriol, thiodiglycol, hexylene glycol, and diethylene glycol; glycerol; and lower alkyl ethers of alcoholic polyols such as ethylene glycol monomethyl or monoethyl ether, diethylene glycol methyl or ethyl ether, and triethylene glycol monomethyl or monoethyl ether. A surfactant, useful for wetting and reducing the surface tension of the ink system, can be provided as well. In addition to the above, other ink additives commonly known in the art may also be used. These include, water-soluble organic cosolvents, humectants, biocides, fungicides, defoamers, corrosion inhibitors, viscosity modifiers, pH buffers, penetrants, sequestering agents, and the like.

Current compounding technology for the processing of pigment dispersions employs numerous processing technologies. One such technology makes use of ultrasonic energy to achieve mixing and particle deflocculation. Another technology makes use of media mills, such as ball mills, sand mills or attritors. Media mills achieve acceptable pigment dispersions by subjecting the pigment mixture to high intensity microshearing and cascading which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

Problems associated with media milling systems can be overcome, at least in part, using homogenizers and emulsifiers. These systems generally function by forcing a premix of solids and liquids to collide against a surface, or to collide against itself. Unfortunately such high pressure devices are considered to be unsuitable for processing pigment dispersions due to the abrasive nature of the pigment particles and the relatively large size of pigment agglomeration structures which can plug narrow gaps through which such systems force the mixture being treated. Such clogging can be avoided, at least in part, by filtration or preprocessing to reduce the size of pigment agglomerations and to ensure sufficient dispersion of the pigment prior to use of high pressure processing.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create a jet, and the jet streams are recombined by impinging them against each other. Each of these systems has been found to yield satisfactory results when processing water-based pigmented inks.

After the ink has been processed using either of the "wedge" configurations or the "impinging jet" configuration at a concentration of about 15% by weight, it is diluted with an additional amount of deionized water and diethylene glycol to produce a final ink concentration of about 4% concentration with a given diethylene glycol-to-water ratio. In the dilution step, the dispersion is mixed using a shear mixer (available, for example, from Silverson Machines Inc., East Longmeadow, Mass.) at moderate speed while water and diethylene glycol are sequentially added. The addition of diethylene glycol is carried out slowly to prevent flocculation of the dispersion.

Following the dilution step, the ink is filtered using, for example, a 5 micron Whatman Polycap 36 HD cartridge type filter (available from Arbor Technology, Ann Arbor, Mich.). A pump, such as a Masterflex peristaltic pump (available from Barnant Co., Barrington, Ill.) can be used to feed the ink through the filter. A flow rate of about 120 milliliters per minute with a back pressure of about 3 psi is preferred. Further examples of suitable inks are given in the co-pending US patent application also owned by Minnesota Mining and Manufacturing Co. having Ser. No. 08/556,336 and a PCT application PCT/US96/16148 which claims priority therefrom, both of which are incorporated herein by reference.

In accordance with the present invention the display device 4 of FIG. 1 may be a black or dark layer. This layer faces towards the inside of a bus or building window to which the graphic has been applied. It is preferable that this black layer is uniform and that the graphic is durable, in particular water resistant.

Another ink jet formulation replaces the dispersants previously described with water-soluble silicone polymers such as poly(dimethylsiloxane)-g-poly(acrylate)s as additives in water-based pigmented inks for ink jet printing, particularly thermal ink jet printing. Further information about these ink jet formulations can be found in copending, coassigned PCT patent application serial no. PCT/US96/16148 incorporated herein by reference.

Not only the inks but also the ink jet printing substrate is preferably durable. In accordance with the seventh and eighth embodiments, suitable durable receptor sheetings for durable ink jet printed graphic products of the present invention will now be described. Advantageously the articles of the seventh and eighth embodiments accept pigment-based ink jet inks when the substrate is comprised of weatherable plastic materials, allowing for heat and light stable image constructions under such circumstances as are found in exterior signing environments.

Figure 11:
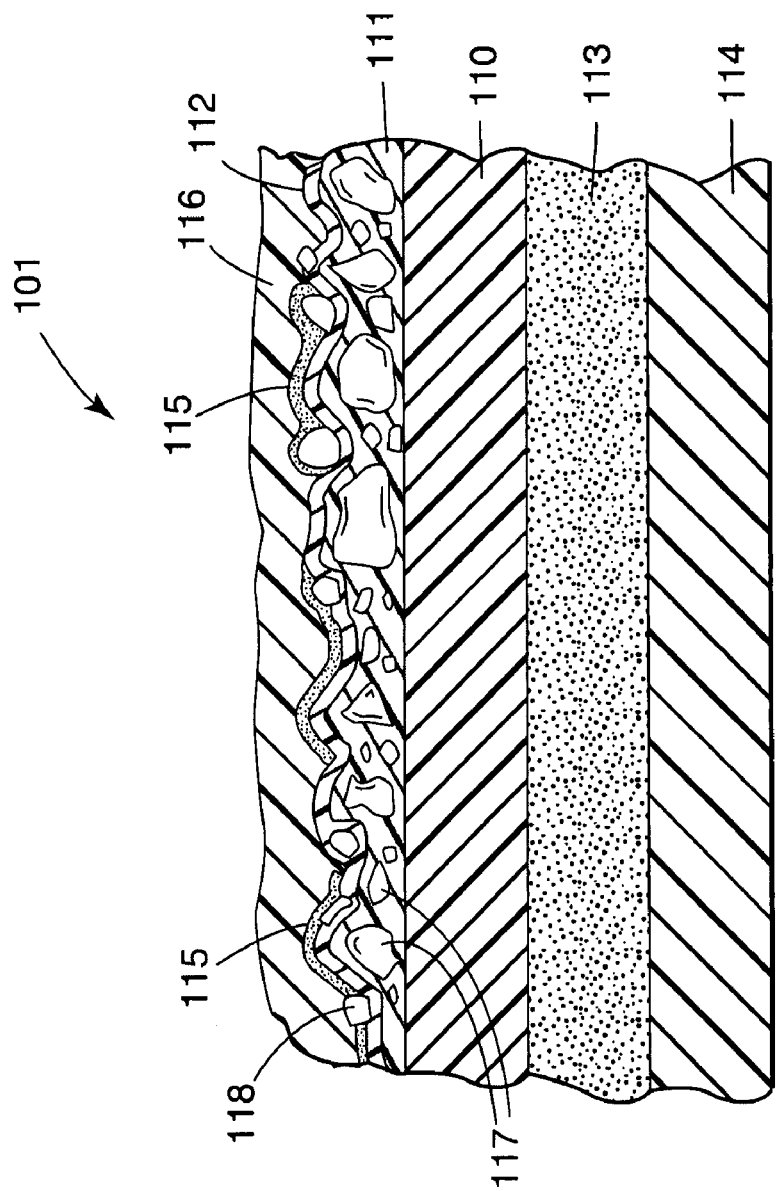
FIG. 11 is a cross-section view of a printing substrate in accordance with a seventh embodiment of the present invention.

Referring to FIG. 11 an ink jet printing sheet (101) of the present invention is illustrated comprising (a) an image receiving layer (111-112) on (b) a substrate (110), wherein the sheet may optionally have (c) a layers of adhesive (113) coated or laminated to the substrate (110) on the surface away from the image receiving layer (111-112). The adhesive layer (113) may or may not be backed with release liner (114). In this embodiment (FIG. 11), the image receiving layer (111-112) comprises at least two layers, wherein one layer is a protective penetrant layer (112) and one layer is an ink jet receptor layer (111).

Once the ink jet printing sheet has been imaged with ink jet ink (shown as patches of dried ink containing pigment particles) (115) using an ink jet printing process, the printed sheet (101) may be overlaminated with a transparent protective layer (116). The transparent protective layer (116) may be a transparent plastic sheet bearing on one side a pressure-sensitive adhesive or hot-melt (thermal) adhesive, or a clear coat, or a processing technique that will affect the surface of the printed sheet (101).

Both ink jet receptor layer (111) and protective penetrant layer (112) have particles (117) and (118), respectively, that contribute to the performance of the printed sheet.

Typically, a release liner (114) comprises a paper or plastic or other suitable sheet material coated or otherwise treated with a release material such as a silicone or fluorocarbon type material on at least one surface in contact with adhesive layer such that adhesive layer adheres to release layer but is easily removed from the release liner when desired so that the adhesive layer is exposed.

Briefly, in one aspect of the seventh embodiment of the present invention, an ink jet printing sheet is provided comprising a substrate and an image receiving layer contacting the substrate, wherein the image receiving layer comprises of at least one protective penetrant layer of one composition and at least one ink jet receptor layer of a second composition, and wherein the irk jet receptor layer contains dispersed particles or particulates of a size that causes protrusions from the protective penetrant layer. Optionally, on the side of the substrate opposite from the image receiving layer, in sequential order, is an adhesive layer and a release liner.

An advantage of the seventh embodiment is an ink jet printing sheet wherein the substrate and adhesive are durable for periods of several years in an exterior environment where the materials and images can be exposed to rain, sun, and such variations in temperature as are found in exterior environments and on surfaces in exterior environments. Typically, the articles of the present invention have some flexibility such that it may be adhered onto surfaces having some curvature or non uniformity e.g., windows with screw heads or rivets, without easily ripping the material or cracking, or delamination of the image receiving layers, overlaminating layers, other coatings or image or "tenting" of the material over the protrusion.

The ink jet printing sheet provides useable images using both dye-based and pigment-based ink jet inks suitable for use, for example, in wide-format ink jet printers wherein both narrow or wide images can be made by ink jet printing process. The resultant printed sheet is easily handleable without easy smearing of the image and can be applied, when an adhesive layer is part of the ink jet printing sheet, to a window, vehicle side or other surface using techniques well known in the art without use of other devices such as spray adhesives.

Finally, the articles of the seventh embodiment maintain other desirable properties of an ideal ink jet printing sheet, such as, dye bleed resistance and low background color. Good color saturation and density are also observed in the printed images. The printed articles do not curl excessively on exposure to humidity or during the ink jet printing process, and printed images exhibit quick ink drying times following printing with good image sharpness.

Ink jet printing sheets are commercially available from the Commercial Graphics Division of 3M. Ink jet printing sheets are also described in PCT Publication WO 96/08377, which is incorporated by reference herein.

Further embodiments are described in co-pending U.S. patent application Ser. No. 08/554,256 and its corresponding PCT patent application from claiming priority therefrom, both of which are incorporated herein by reference.

Figure 7:
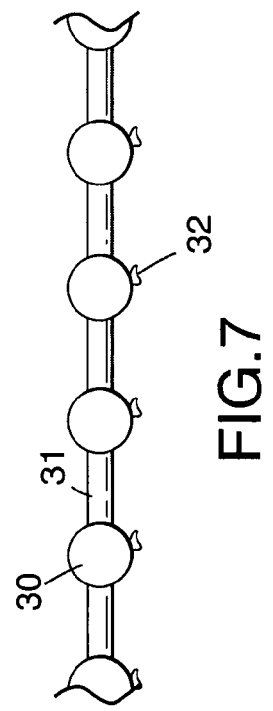
FIG. 7 shows a cross-section view backlight for use with the second embodiment of the present invention.

In accordance with the present invention and shown schematically in FIGS. 1, 7 and 8, six or seven layers of ink may be printed with close registration to each other. It is preferable if the inks are quick drying. The eighth embodiment of the present invention addresses quick drying receptor materials for ink jet printers. Further, ink receptor layers are not perfectly and a method of improving the transparency would be preferable.

The eighth embodiment may provide in one aspect an inkjet recording medium comprising a hydrophilic, microporous, polymer membrane having opposing major surfaces and a non-porous hygroscopic layer residing on at least one major surface of the membrane.

The hygroscopic layer provides a means for receiving an inkjet image and retaining dyes and pigments contained in the ink.

The hydrophilic, microporous, polymeric membrane provides a means for durably supporting the hygroscopic layer containing the inkjet image and also a means for diffusing the solvents contained in the inks from the dyes and pigments retained in the hygroscopic layer.

The combination of the hygroscopic layer and the hydrophilic, microporous, polymeric membrane provides the means for rapidly producing a precise inkjet image in a durable medium.

For purposes of this invention, "hydrophilic" means that the contact angle of the liquid on the surface is less than 90 degrees. For purposes of this invention, "hygroscopic" means the layer is capable of being wet by a water-based blend of solvents and surfactants used in inkjet inks, and the water-based blend is absorbed by the layer. For purposes of this invention, "microporous polymeric membrane" means a polymer film that contains an interconnecting void structure. For purposes of this invention, "non-porous layer" means a layer that does not contain an interconnecting void structure. For purposes of this invention, "hydrophilic microporous polymeric membrane" means a polymer film whereby the capillary and surface tension forces of the water-based liquids, such as a blend of solvents and surfactants, will cause the liquid to be absorbed, i.e., to enter the pores of the membrane. Preferably, the membrane will absorb water with less than one atmosphere of pressure. For the purposes of this invention, "precise" means that dot spread resulting from applying an ink jet drop to the sheet, is below a level at which the resolution of the image is adversely affected. Examples without precise imaging might show image bleed, uneven edges, or mottled colors.

Figure 12:
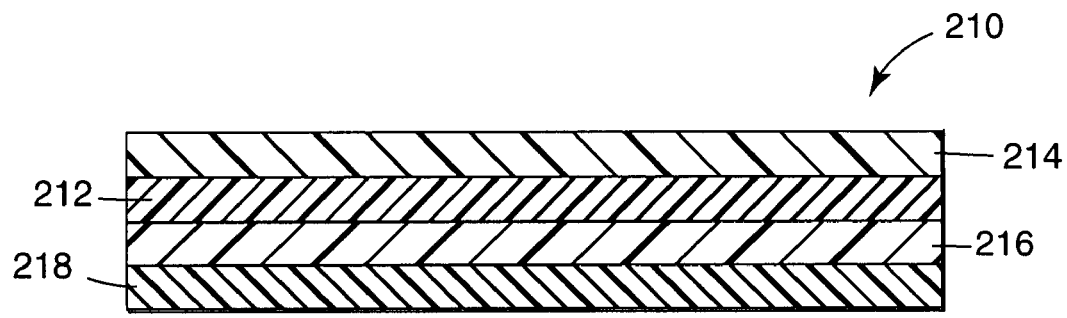
FIG. 12 is a cross-sectional view of a of a printing substrate in accordance with an eighth embodiment of present invention.

In an eighth embodiment of the invention, inkjet recording medium 210 of FIG. 12 is comprised of a hydrophilic, microporous, polymeric membrane 212 having a hygroscopic layer 214 thereon. The layer 214 can be coated on or laminated to the membrane 212 using techniques known to those skilled in the art of coating or laminating of multiple layered constructions. Non-limiting examples of coating or laminating techniques include notched bar coating, curtain coating, roll coating, extrusion coating, gravure coating, calendering, and the like.

Hydrophilic, microporous, polymeric membrane 212 is hydrophilic and receptive of aqueous solvents typically used in inkjet formulations. Microporous membranes are available with a variety of, pore sizes, compositions, thicknesses, and void volumes. Microporous membranes suitable for this invention preferably have adequate void volume to fully absorb the inkjet ink discharged onto the hydrophilic layer of the inkjet recording medium. It should be noted that this void volume must be accessible to the inkjet ink. In other words, a microporous membrane without channels connecting the voided areas to the hygroscopic surface coating and to each other (i.e., a closed cell film) will not provide the advantages of this invention and will instead function similarly to a film having no voids at all.

Void volume is defined in ASTM D792 as the (1−Bulk density/Polymer density)*100. If the density of the polymer is not known, the void volume can be determined by saturating the membrane with a liquid of known density and comparing the weight of the saturated membrane with the weight of the membrane prior to saturation. Typical void volumes for hydrophilic, microporous, polymeric membrane 212 range from 10 to 99 percent, with common ranges being 20 to 90%.

Void volume combined with membrane thickness determines the ink volume capacity of the membrane. Membrane thickness also affects the flexibility, durability, and dimensional stability of the membrane. Membrane 212 can have a thickness ranging from about 0.01 mm to about 0.6 mm (0.5 mil to about 30 mils) or more for typical uses. Preferably, the thicknesses are from about 0.04 mm to about 0.25 mm (about 2 mils to about 10 mils).

The liquid volume of typical inkjet printers is approximately 40 to 140 picoliters per drop. Typical resolution is 118 to 283 drops per centimeter. High resolution printers supply smaller dot volumes. Actual results indicate a deposited volume of 1.95 to 2.23 microliters per square centimeter with each color. Solid coverage in multicolor systems could lead to as high as 300% coverage (using undercolor removal) thus leading to volume deposition of 5.85 to 6.69 microliters per square centimeter.

Hydrophilic, microporous, polymeric membrane 212 has a pore size that is less than the nominal drop size of the inkjet printer in which the inkjet recording medium is to be used. The pore size may be from 0.01 to 10 micrometers with a preferred range of from 0.5 to 5 micrometers with pores on at least one side of the sheet.

The porosity, or voided aspect, of membrane 212 need not go through the entire thickness of the membrane, but only to a sufficient depth to create the necessary void volume. Therefore, the membrane may be asymmetric in nature, such that one side possesses the aforementioned properties, and the other side may be more or less porous or non-porous. In such a case, the porous side must have adequate void volume to absorb the liquid in the ink that is passed through the hygroscopic layer 214.

Non-limiting examples of hydrophilic, microporous, polymeric membranes include polyolefins, polyesters, polyvinyl halides, and acrylics with a micro-voided structure. Preferred among these candidates are a microporous membrane commercially available as "Teslin" from PPG Industries as defined in U.S. Pat. No. 4,833,172 and hydrophilic microporous membranes typically used for microfiltration, printing or liquid barrier films as described in U.S. Pat. Nos. 4,867,881, 4,613,441, 5,238,618, and 5,443,727, which are all incorporated by reference as if rewritten herein. Teslin microporous membrane has an overall thickness of approximately 0.18 mm, and the void volume has been measured experimentally to be 65.9%. The ink volume capacity of the membrane is thus 11.7 microliters per square centimeter. Therefore, this membrane has sufficient void volume combined with thickness to fully absorb the ink deposited by most inkjet printers, even at 300% coverage, without considering the amount retained in the hygroscopic layer.

Membrane 212 can optionally also include a variety of additives known to those skilled in the art. Non-limiting examples include fillers such as silica, talc, calcium carbonate, titanium dioxide, or other polymer inclusions. To obtain clarity these fillers may be milled until their particle size is below the wavelength of light. It can further include modifiers to improve coating characteristics, surface tension, surface finish, and hardness.

Hygroscopic layer 214 can be a coated layer or laminated layer on that portion of membrane 212 upon which the inkjet image is to be formed. Thus, layer 214 need not cover completely the membrane 212. Nor need layer 214 cover both sides of membrane 212. Layer 214 preferably lies substantially on the surface of membrane 212 and does not contact the inner pore surfaces of the membrane. Depending on the ultimate purpose for the medium 210, at east one side of membrane 212 may be covered at least in part by layer 214 and the other side may be sealed or coated with another material, such as an anti-static coating, adhesive, barrier layer, strength enhancing layer, etc.

Layer 214 can be constructed from a variety of naturally occurring or synthetically constructed materials known to those skilled in the art for providing an ink receptive surface. Non-limiting examples of the materials used for forming layer 14 include polyvinyl alcohol, polyvinyl pyrrolidone, cellulose derivatives such as carboxymethyl cellulose, polyethylene oxide, water soluble starches and gums. In addition, inorganic fillers such as silica, talc, calcium carbonate, titanium dioxide can be beneficial to enhance handling, strength, wetting, or control viscosity. Mordants, such as in U.S. Pat. Nos. 5,354,813 and 5,403,955 and color stabilizers can also be included.

Of these materials, hygroscopic, polymeric coatings are preferred due to ease of manufacturing and performance to provide an ink receptive surface for receiving and permanently contacting and retaining dyes and pigments in a precise inkjet image. Of these coatings, poly(N-vinyl lactams), polyethylene oxides, methyl and propyl cellulose derivatives, and poly(vinyl alcohols) are particularly preferred.

Hygroscopic layer 214 may be formed on membrane 212 using a number of techniques, including coating, laminating, or co-extrusion. When a hydrophilic coating solution is applied to the membrane, solution viscosity and concentration will affect the performance of the resulting inkjet recording medium. For example, low viscosity coating solutions coated on membranes with very high porosity and/or large pore size tend to fill the pores, resulting in a coated membrane that is saturated with hygroscopic polymer and has little or no coating on the surface. Membranes coated in such a manner do not meet the requirements of this invention because the imaged medium usually exhibits lower image density and contrast and can dry more slowly.

Preferably, medium 210 after imaging can have the pore structure of membrane 212 collapsed to provide transparency by a post treatment such as heating or calendering, such as disclosed in U.S. Pat. No. 5,443,727.

Further embodiments are given in co-pending U.S. patent application Ser. No. 08/614,986 and a PCT patent application claiming priority therefrom, both of which are incorporated herein by reference.

Ninth and tenth embodiments of a direct printing method in accordance with the present invention relate to electrostatic printing. The term "electrostatic" is used for recording processes in which a recording head is utilized to impose an electrostatic pattern upon a recording medium, and in which a toner material is subsequently attracted to, and affixed to the electrostatic pattern. Processes of this type are employed for preparing engineering graphics, artwork for advertisements, displays and the like.

In a typical electrostatic imaging process, a recording head which includes a linear array of a plurality of separately chargeable electrodes, generally referred to as "nibs", is scanned across a recording medium, and the nips are selectively energized to impose an electrostatic pattern upon the medium. The charged medium is contacted with a toner, which typically comprises a liquid containing a pigment or dye thereon. Excess toner is removed from the medium, leaving toner only in the charged areas. The toner is subsequently dried or otherwise fixed to produce a permanent image. The process can be utilized for single color or full color graphics and can be completed in a single pass across the medium or in multiple passes across the medium.

The recording medium is an important component of the electrostatic imaging system. The medium must be able to accept, retain, and discharge the electrostatic pattern. The medium must also be compatible with the toner system employed as well as the particular imaging hardware, such as a single or multiple pass electrostatic printer.

In accordance with the ninth embodiment of the present invention electrostatic printing of media requires the printing of electrostatic images on a dielectric paper construction followed by transfer of that image to polymer films. Such conventional electrostatic imaging is disclosed in U.S. Pat. No. 5,114,520 (Wang et al.).

The dielectric paper construction typically comprises a paper or paper-like substrate, a conductive layer coated on a major surface of the substrate, a dielectric layer coated over the conductive layer, and a release layer coated above, beneath, or with the dielectric layer to assure that the image received above the dielectric layer can be transferred to the final substrate upon application of heat and pressure. A commercially available example of this transfer process and the products to accomplish that process is the Scotchprint™ Electronic Graphics System available from Minnesota Mining and Manufacturing Company of St. Paul, Minn. which is one direct printing method in accordance with the present invention. A further suitable system for carrying out the present invention is the printer DCS 5400 and associated inks, including white and silver spot colors for the silhouette layer 2, available from Raster Graphics Inc., San Jose, Calif., USA.

Both single pass and multipass electrostatic printers may be used. Multipass printers have a single printing head and feed the appropriate primary color to the head in each pass. In accordance with the present invention the sequence of toners may be used to print the sequence of colors described with reference to FIGS. 9 and 10: an initial dark layer 42, a light colored light restricting layer 43 and CMYK layers 44 to 47 or vice versa. Single pass machines have presently four or five printing heads arranged parallel to each other in the longitudinal printing direction. In accordance with the present invention conventional single pass machines may be modified to run multipass. For instance, a four head electrostatic printer may be modified to apply the dark layer 42 including printing registration marks along the longitudinal edges of the printing substrate, and three identical layers of the light restricting layer 43 on top of each other to increase the opacity of this layer. In the second pass, the CMYK image layers 44 to 47 are applied using the registration marks to maintain registration. Alternatively, a five head electrostatic printer may be used to print the dark layer 42, the light restricting layer 43 and then CMY image layers 44 to 46 in one pass, using process (CMY) black instead of the final black station. Due to the considerable under color removal in accordance with the present invention, a separate black (K, layer 47) is often not necessary.

A preferred transparent printing substrate, to which the image is transferred from the electrostatic paper, is the optically clear vinyl sheeting of the eleventh embodiment. Transfer of the image from the electrostatic paper to the transparent substrate in the laminator may result in some reduction of optical clarity of the printing substrate in the transparent areas. This can be corrected by running the printed substrate through the laminator again after transfer of the image using an optically flat sheet as a former such as polyester sheet. Polyester does not soften at laminator temperatures so that there is no transfer of the image to the polyester.

One aspect of the tenth embodiment of the present invention is the construction of a film for the direct printing of electrostatic images.

In one aspect, the direct print film comprises a durable, conformable, polymeric substrate having a conductive layer prepared from a coating solution comprising conductive pigment and organic solvent.

Preferably, the conductive pigment in the conductive layer has a bulk powder resistivity ranging from about 2 to about 15 Ohm-cm.

"Bulk powder resistivity" means electrical resistivity of the bulk powder used in the conductive pigment according to the following test described by E.I. DuPont, one of the commercial suppliers of conductive pigments. As described in Capano et al., "The Application of ZELEC ECP in Static Dissipative Systems" (Du Pont Chemicals, Deepwater, N.J. September 1992), a cylindrical cell, with electrodes at the top and bottom is used to make bulk powder resistivity measurements. A weighed amount of powder is placed into the cell and then pressed with a laboratory press into a pellet. The resistance between the two electrodes is then measured as a function of the pressure applied and the thickness of powder pellet. The bulk powder resistivities of Du Pont conductive pigments commonly range from about 2 Ohm-cm to about 20 Ohm-cm according to this test. Another supplier of conductive pigments, Goldschmidt A.G. of Essen, Germany, identifies bulk powder resistivity as "specific resistance" and employs a test method available from Esprit Chemical Company of Rockland, Md. For purposes of this application, the property of "bulk powder resistivity" includes the concept of the property of "specific resistance".

In another aspect, the direct print film comprises a durable, conformable, polymeric substrate having on a major surface a conductive layer coated thereon, and a dielectric layer coated on the conductive layer, wherein the dielectric layer includes spacer particles and abrasive particles. Spacer particles, which are generally of a lower hardness than abrasive particles and/or have a more rounded configuration than abrasive particles, function to provide a roughness that maintains a relatively small gap between the imaging head of the electrostatic printer and the remaining surface of the direct print film. Abrasive particle, function to provide abrasivity to contact the imaging head of the electrostatic printer in order to clean oxidation and other unwanted debris from the imaging head.

Optionally, the direct print film has a field of pressure sensitive adhesive coated on the other major surface of the direct print film, protected by a release liner. The field of pressure sensitive adhesive permits the direct application of the film having an image printed thereon to be adhered to a final location.

An advantage of the present invention is the ability to eliminate manufacturing steps for the preparation of electrostatic images on a final substrate.

An electrostatic direct printing film can have a surface resistance in its conductive layer of about $2 \times 10^5$ to about $3 \times 10^6$ Ohms/□ and can have a surface resistance in its dielectric layer of greater than about $1 \times 10^8$ Ohms/□. This difference in surface resistance results in clear, crisp images generated by the electrostatic printer.

"Surface Resistance" is the measure of D-C resistance of moderately conductive materials according to ASTM Test Designations D 4496-87 and D 257-93.

Figure 13:
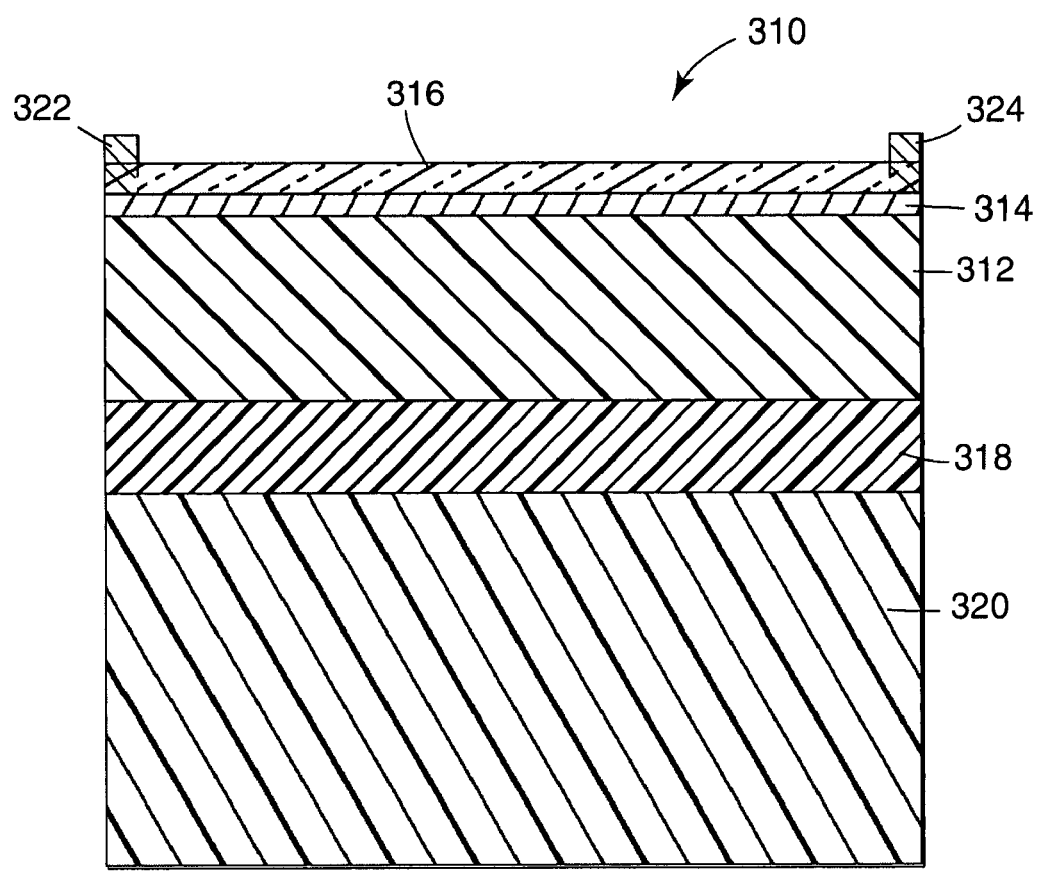
FIG. 13 is a cross-sectional view of a printing substrate of a tenth embodiment of the present invention.

Referring to FIG. 13, a typical construction of a film of the present invention 310 comprises a substrate film 312 having on a major surface thereof, a conductive layer 314 and a dielectric layer 316. On the opposite major surface of film substrate 312 resides optional pressure sensitive adhesive 318 protected by a release liner 320.

For electrostatic imaging on film 310, a conductive coating layer 314 is provided from an organic solvent-based conductive coating solution on the upper major surface of film substrate 312, which can be any substrate described above for prior embodiments. Electronically conductive layers employ a plurality of particles of a transparent, electrically conductive material such as antimony doped tin oxide or the like, disposed in a polymeric matrix. Conductive layer 314 is prepared from a solution of a conductive formulation that generally comprises a binder, conductive pigments, dispersant, and organic-based solvent, the latter of which is removed during the manufacturing process. The weight percent of solids to organic solvent in the conductive formulation can range from about 10 to about 40, with about 25 weight percent being presently preferred for ease of application to film substrate 312.

After coating of conductive formulation on film substrate 312 and evaporation or other removal of organic solvent, the thickness or caliper of the conductive layer 314 can range from about 2 to about 5 μm with about 3 μm being presently preferred.

Non-limiting examples of binders include acrylics, polyester, and vinyl binders. Among acrylic binders, carboxylated acrylate binders and hydroxylated acrylate binders are useful for the present invention, such as those commercially available from Allied Colloids of Suffolk, Va. such as "Surcol SP2" carboxylated acrylate binder and "Surcol SP5 hydroxylated acrylate binder. Among some of the polyesters materials which can be employed as binders are materials sold by Goodyear of Akron, Ohio under the brand "Vitel", of which grades PE222 and PE200 are particularly suitable for use in the present invention. Also vinyl resins such as "UCAR" "VAGD" brand resins from Union Carbide of Danbury, Conn. can also be useful.

Conductive pigments can include antimony-containing tin oxide pigments or other pigments such as indium doped tin oxide, cadmium stannate, zinc oxides, and the like.

Non-limiting examples of antimony-containing tin oxide conductive pigments include those pigments disclosed in U.S. Pat. No. 5,192,613 (Work, III et al.); U.S. Pat. No. 4,431,764 (Yoshizumi), U.S. Pat. No. 4,965,137 (Ruf); U.S. Pat. No. 5,269,970 (Ruf et al.); and in product literature for "Tego S" pigments commercially available from Goldschmidt AG of Essen, Federal Republic of Germany and "Zelec" pigments commercially available from DuPont of Wilmington, Del. Generally particle size should be reduced by a milling process particularly when the Goldschmidt Tego S conductive pigment is employed. Pigments are preferably milled until the particle size is smaller than the wavelength of visible light. Scattered transmittance of conductive layer 314 should be 10% or lower.

Particle size of the conductive pigments in the conductive layer 314 can range from about 0.02 to about 0.4 μm. Below about 0.02 μm particle size, the conductive pigment is too easily imbibed with solvent action, whereas at greater than 0.4 μm, the conductive layer 314 may affect transparency.

Preferably, the average particle size can range from about 0.05 μm to about 0.2 μm, with particles of about 0.1 μm being most preferred.

The bulk powder resistivity can range from about 2 to about 15 Ohm-cm with about 2 to about 10 Ohm-cm being preferred and about 6 to about 7 Ohm-cm being presently preferred. With the DuPont pigments, the bulk powder resistivity can be about 2-5 Ohm-cm for "Zelec 3410-T" pigments and 4-15 Ohm-cm for "Zelec 2610-S" found acceptable for the present invention. The bulk powder resistivity has been found to be important in controlling the final appearance of the image on the direct print film because materials that are too resistive require the use of a larger amount of conductive pigment can cause an objectionable amount of background color in the final image.

The "Tego S" particles are identified to have a specific resistance of 10, which is believed to compute to about bulk powder resistivity of about 10.

A variety of surfactant materials can be employed as dispersants for the conductive layer 314 in the present invention, including nonionic and anionic dispersants. In general, anionic dispersants are most preferred, although the invention is not limited thereto. One particularly preferred anionic dispersant is a material branded "Lactimon" dispersant from BYK-Chemie USA Corporation of Wallingford, Conn. Also commercially available from BYK-Chemie USA Corporation is a nonionic dispersant is branded "Anti Terra U" dispersant.

Non-limiting examples of solvents for the conductive formulation include ethyl acetate and ethanol.

Formulations of the conductive layer 14 require a weight ratio from about 5:1 to about 1:1 of pigment:binder with a preference of a weight ratio of 3:1 pigment:binder. When "Tego S" conductive pigment is employed, the weight ratio can range from about 3.0:1 to about 4.7:1 pigment:binder. When the DuPont "Zelec" conductive pigment is employed, the weight ratio can range from about 1:1 to about 4:1 pigment:binder.

When the pigment to binder ratio falls below 1:1, there is inadequate bulk conductivity of layer 314. When the weight ratio of pigment:binder exceeds about 5:1, there is insufficient cohesive strength of the layer 314 on film substrate 312.

Dielectric layer 316 can be coated on conductive layer 314 to provide the electrostatic capacitance required for electrostatic imaging.

The dielectric layer 316 is of relatively high electrical resistivity and contributes to the performance of film 310 for direct printing of images electrostatically. In addition to providing the interface of film 10 with the recording head and toner, dielectric layer 316 covers and protects conductive layer 314 and provides the top surface for film 310.

Dielectric layer 316 is coated on layer 314 from a dielectric formulation that comprises particulate matter of both spacer particles and abrasive particles, preferably in particular ratios dispersed in a binder.

Both the spacer particles and the abrasive particles should be selected with consideration to the refractive index thereof, so as to provide index matching to the remainder of dielectric layer 316 and film 310. In this manner, film 310 has a uniform transparent appearance. The spacer particles can be fabricated from a material having sufficient rigidity to withstand coating and handling, but need not be highly abrasive. Non-limiting examples of materials useful as spacer particles include relatively soft materials such as a polymer or a mineral or relatively hard materials such as silica or glass, provided that such relatively hard materials have a relatively rounded configuration. More particularly, useful spacer particles can be made from synthetic silicas, glass micro beads, natural minerals, polymeric materials such as polypropylene, polycarbonate, fluorocarbons or the like.

Typically spacer particles have an average size ranging from about 1 to about 15 μm, and preferably below about 10 μm. In general, spacer particles will be present in a distribution of sizes, although it is most preferred that the particles remain in a size range of about 3-10 μm. To improve transparency particle sizes may be reduced to 0.4 μm or below.

One particularly preferred group of spacer particle materials comprise amorphous silica, of which is most preferred the synthetic, amorphous silicas sold by the W.R. Grace Corporation under the brand "Syloid 74". These materials have an average particle size of approximately 3.5-7.5 μm as measured on a Coulter apparatus and an average particle size of 6-10 μm as measured on a Malvern analyzer. One specific member of this group of materials comprises "Syloid 74X-Regular" particles which have an average particle size of 6.0 as measured on a Coulter apparatus.

Abrasive particles useful for dielectric layer 316 of the present; invention are provided to assure that the performance of spacer particles and abrasive are effectively decoupled so as to provide an optimized dielectric medium.

The abrasive particles will generally be harder than the spacer particle material chosen and will usually have a more irregular configuration or texture than the spacer particle material. Among some of the preferred abrasive materials are silica materials such as microcrystalline silica and other mired or processed silicas, as well as other abrasives such as carbides and the like.

The abrasive particles generally have the same size range as the spacer particles, typically in the range of about 1 to about 15 μm rind preferably less than 10 μm.

One particularly preferred group of abrasive materials comprises mined, microcrystalline silica sold under the brand "Imsil" by Unimin Specialty Minerals, Inc. of Elko, Ill. These materials comprise 98.9% silica with minor amounts of metal oxides. One grade having particular utility comprises "Imsil A-10" which has a median particle size of 2.2 μm, and range of particle sizes such that 99% of the particles have a size less than 10 μm and 76% of the particles have a size of less than 5 μm.

The proportion of spacer particles to abrasive particles are such that the spacer particles are present in a larger amount. Preferably, the ratios of spacer to abrasive particles fall within the range of about 1.5:1 to about 5:1. Most preferably, the ratio of spacer to abrasive particles is approximately 3:1.

The spacer particles and abrasive particles are disposed is a binder which generally comprises a polymeric resin. The resin should be of fairly high electrical resistivity, and should be compatible with both types of particles and the toner. The resin should have sufficient durability and flexibility to permit it to function in the electrostatic imaging process and should be stable in ambient atmospheric conditions and transparent.

There are large number of resins that meet these criteria. One preferred group of materials are the acrylic copolymers of the type commercially available from Rohm and Haas of Philadelphia, Pa. under the brand "Desograph-E342-R".

A coating mixture to prepare dielectric layer 316 can employ solvents such toluene into which the binder, spacer particles, and abrasive particles can be added as solids. The range of total solids in the coating mixture can be from 10 to about 35 and preferably about 15 to 25 weight percent of the total coating mixture. Of the total solids, the binder solids can comprise from about 93 to about 78 and preferably 82 weight percent. Of the total solids, the particles solids (preferably in a 3:1 spacer:abrasive mixture) can comprise from about 7 to about 22 and preferably 18 weight percent.

The particle solids for the coating mixture can be blended by ball milling for approximately two hours at room temperature. Under these conditions, there is no significant reduction in particle morphology, and the ball milling process only serves to mix and disperse the particles. Other processes could be employed.

There is a conflict between the need for surface roughness for good printing and a need for a smooth surface to provide good transparency. Surface roughness is desired to provide topography for deposition of toner particles is based on a Sheffield measurement method described in TAPPI Test T 538 om-88 published by the Technical Association of the Pulp and Paper Industry of Atlanta, Ga., incorporated herein by reference. For printing, the dielectric layer 316 should have a surface roughness ranging from about 50 to about 200 Sheffield units and preferably from about 80 to about 180 with 140 being presently preferred. On the other hand, a surface with less than 10 Sheffield units is preferred for transparent, particularly optically clear areas in the print. According to the present invention it is preferred to print onto a surface of 50 to 80 Sheffield units (lower end of the acceptable range) and then to subject the finished print to a post-print calendering process using an optically flat former such as all optically clear polyester film.

Referring again to FIG. 13, a pair of electroconductive ground stripes 322 and 324 can be provided in order to aid in the prevention of "leading edge fog" by providing an avenue for residual charge to be eliminated from the ground plane. These stripes 322 and 324 ranging from about 0.76 to about 2.54 mm wide are applied to dielectric layer 316 at opposing lateral edges of film 310.

Stripes 322 and 324 can be made from a conductive ink sold under the brand "Multifilm, Conductive Black Ink 9093E20J" from Raffi and Swanson of Wilmington, Mass. and are configured to permeate dielectric layer 316 at such lateral edges of film in order to provide an electrical ground to the conductive layer 312.

Thus, a film 310 of the present invention can have in sequential order, a release liner 320 comprising from about 0.07 to about 0.15 mm (about 3 to about 6 mils) thickness, a field of pressure sensitive adhesive 318 comprising about 0.03 mm (about 1 mil) thickness, a film substrate 312 comprising from about 0.05 to about 0.10 mm (about 2 to about 4 mils) thickness, a conductive coating layer 314 comprising from about 1 to about 5 micrometers (0.04-0.2 mils), a dielectric layer 316 comprising from about 2 to about 4 micrometers (0.08-0.16 mils) thickness, and a pair of electroconductive ground stripes 322 and 324 at lateral edges of film 310 that permeate layer 316 to layer 314.

A preferred method of constructing films of the pr sent invention comprises a modular construction, but can comprise a sequential construction. In the sequential construction, beginning with release liner 320, each of the layers 318, 316, 314 and 312 are built on top of release liner 320.

Preferably, the method of the present invention employs a modular construction wherein the first step is the casting of a film or organosol onto a temporary release liner, preferably an optically flat release liner in accordance with the eleventh embodiment of the present invention, followed by fusing the organosol to form a substrate 312 according to techniques known to those skilled in the art. In an independent module, the field of pressure sensitive adhesive 318 is cast on release liner 320, preferably an optically flat liner in accordance with the eleventh embodiment of the present invention and the techniques described later. Then, the module of film substrate 312 on the temporary liner is joined with the module of field of pressure sensitive adhesive 318 on liner 318 and the temporary liner is discarded.

Alternatively, one can employ a commercially available pressure sensitive adhesive-backed polymeric film in substitution for the above described modular construction.

Conductive layer 314 can be coated on film substrate 312 using any technique known to those skilled in the art, preferably a wire bar coating technique as known to those skilled in the art. The # wire bar of from about 6 to about 40 is used to achieve the 1-5 micrometer thickness described as suitable for layer 314, with a #10 wire bar being useful for DuPont conductive particles and a #12 to #40 wire bar being useful for Tego conductive particles. The wire bar coating process step can operate at a line speed ranging from about 9 meters per minute to about 19 meters per minute and preferably about 12 meters per minute (40 feet per minute).

Dielectric layer 316 is coated on conductive layer 14 according to coating techniques known to those skilled in the art, preferably a reverse gravure coating of the dielectric layer 316 onto conductive layer 314. In those instances where a wire bar is utilized, the total solids are preferably about 16 weight percent. Where a reverse gravure process is employed, the total solids are preferably about 25 weight percent. The ruling mill cylinder having a theoretical "lay down" factor of about 0.031 mm to about 0.078 mm is used to achieve the 1.5-5 micrometer thickness described as suitable for layer 316 with 3 micrometer thickness being preferred. The reverse gravure coating process step can operate at a line speed ranging from about 1.5 to about 62 meters per minute, and preferably about 15 meters per minute. The reverse gravure can operate at a roll ratio ranging from about 0.5 to about 1.5, and preferably about 1.0.

When ground stripes 322 and 324 are employed, such stripes can be applied to lateral edges of film 310 using techniques known to those skilled in the art, preferably an offset gravure or flexographic coating of stripes 322 and 324. Stripes 322 and 324 permeate layer 316 at such lateral edges to create a ground path from stripes 322 and 324 to layer 314. The offset gravure or flexographic coating process step can operate at a line speed ranging from about 12 meter per minute to about 31 meters per minute, and preferably about 15 meters per minute (50 feet per minute).

After imaging, film 310 can be protected with overlaminate films as has been described previously. The overlaminating film of the eleventh embodiment of the present invention is particularly preferred.

Films 310 of the present invention can provide an average color density as measured according to a "Reflective Optical Density of a Status T Method" under the requirements of ANSI/ISO 5/3-1984, ANSI PH2. 18-1985 published by the Graphic Communications Association of Arlington, Va. of from about 1.0 to about 1.6 O.D. Units. Preferably, the average color density ranges from about 1.3 to about 1.5 O.D. Units. These values show that films 310 of the present invention has an excellent color imaging capability after electrostatic printing directly onto film 310 using electrostatic printers otherwise used for the processes described in Wang et al. and Chou et al. above.

Before calendering, films 310 of the present invention can provide a 60° Gloss from about 10 to about 30. 60° Gloss can be measured as described in ASTM D2457-90 (1990). After post-print calendering, transparent areas of film 310 may have a 60° Gloss of 100 to 150. Further embodiments are given in co-pending U.S. patent application Ser. No. 08/581, 324 which is incorporated herein by reference.

Sheeting for overlaminates and printable substrates for use in the embodiments in accordance with the present invention are preferably flexible, weather resistant and optically clear. A suitable substrate is a vinyl sheeting in accordance with an eleventh embodiment of the present invention. Optionally the sheeting may be provided with an optically clear adhesive.

While the optically clear, transparent overlaminates and printing substrates known in the art and mentioned above are quite acceptable for large format graphics uses, vinyl-based optically clear, transparent overlaminate and printing substrate films remain extremely elusive to achieve.

One aspect of the eleventh embodiment of the present invention is an inexpensive, durable, optically clear, transparent layer formed on a polymeric release liner that has preferred surface properties to permit she layer of the present invention to have optical clarity within acceptable ranges.

This layer in accordance with the eleventh embodiment of the invention comprises a composition comprising vinyl chloride resin, optional acrylic resin, optional plasticizer, and optional stabilizer, wherein the composition is formed on a polymeric release liner having thickness values from about 0.05 mm (0.002 inches) to about 0.12 mm (0.005 inches).

The method of forming the layer comprises the steps of: forming the optically clear, transparent layer having two major surfaces from an organosol on a first polymeric release liner having a thickness ranging from about 0.05 mm (0.002 inches) to about 0.127 mm (0.005 inches); optionally adhering a field of pressure sensitive adhesive to a second release liner; and optionally laminating the field of pressure sensitive adhesive to an exposed major surface of the optically clear, transparent layer; and optionally removing the first polymeric release liner.

An advantage of the eleventh embodiment is the ability of the durable, optically clear, transparent layer to provide stabilization and protection from abrasion and ultraviolet light degradation. As shown in FIG. 9, the printing layers 42 to 47 on printing substrate 41 may be protected by an overlaminate 49 which may be the overlaminate in accordance with the eleventh embodiment. However, the vinyl layer in accordance with the eleventh embodiment may also be the printing substrate and overlaminate 41 of FIG. 10 which is adhered to a substrate such as a glass window by adhesive 50 with the image 42-47 therebetween. Therefore, the present invention not only includes printing on to the vinyl layer in accordance with the eleventh embodiment but also includes a method of protecting an image in accordance with the present invention, comprising the steps of forming a layer of the eleventh embodiment on a polymeric release liner; and laminating the layer of the eleventh embodiment over the image.

Figure 14:
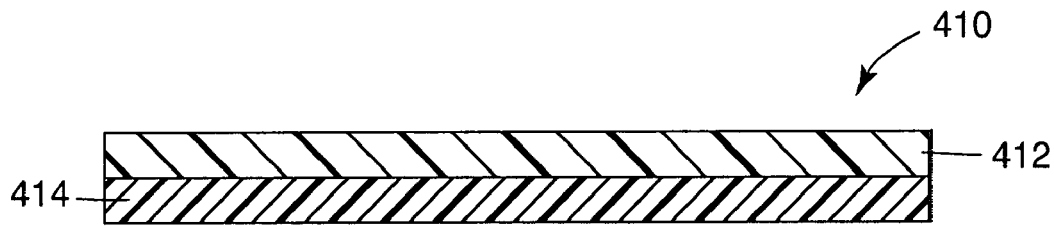
FIG. 14 illustrates a cross-sectional view of a durable, optically clear, transparent layer of the eleventh embodiment of the present invention prepared on a polymeric release layer.

FIG. 14 shows a preparation composite 410 comprising a durable, optically clear, transparent layer 412 of a thermally processable organosol composition on a polymeric release liner 414 having smooth surface properties helpful in the formation of the optical clarity properties of layer 412.

Liner 414 can be made from a polymeric release liner material known to those skilled in the art that has a surface roughness, measured according to Haggerty Sheffield (see above), of from about 1 to about 10 Sheffield units. Selection of the liner 414 should recognize the nature of the surface of liner 414 contacting layer 412 will determine the appearance of the outer surface of layer 412 on the durable, imaged substrate. Non-limiting examples of release liners include silicone coated polyester, urea alkyd coated polyester, and the like. Particularly preferred for release liner 414 is a urea alkyd coated polyester having a urea polymer coating comprising a polyurea alkyd formulation of 0.005 mm caliper on a 0.07 mm polyester film.

Release liner 414 can have a gloss ranging from about 100 to about 150 and preferably from about 120 to about 140. Gloss is measured by a Gardner 60° Glossmeter using published techniques known to those skilled in the art such as ASTM Standard No. D523.

Durable, optically clear, transparent layer 412 comprises a thermally processable composition containing vinyl chloride, optional additional thermally processable resins, an optional plasticizer, and an optional stabilizer where the layer can be prepared from an organosol with a sufficient melt temperature to be thermally processable to cause layer 412 to form on the polymeric release liner 414 without causing harm to the surface of liner 414 responsible for formation of the optical clarity properties of the layer 412.

Vinyl chloride is an industrial chemical commercially available from many sources throughout the world. Preferably, the vinyl chloride useful in the present invention is a vinyl chloride resin comprising Geon vinyl chloride resin commercially available from B. F. Goodrich Chemical Company of Cleveland, Ohio.

When used as another, but optional resin, in the formation of layer 12, acrylic resin is readily available as an industrial chemical commercially available from many sources throughout the world. Desirably, the acrylic resin useful in layer 12 comprises from about 75,000 to about 125,000 number average molecular weight. Preferably, the acrylic resin useful in the present invention is an acrylic resin comprising Elavacite acrylic resin having about 100,000 molecular weight commercially available from ICI Resins of Wilmington, Del.

Optionally, the composition for layer 412 comprises a plasticizer to aid in the formation of layer 12 and its transfer to a durable, imaged substrate. Non-limiting examples of plasticizer include 1,4-butylene glycol; adipic acid; butyloctyl phthalate; hydrocarbon resins; di(2-ethylhexyl) azelate; dibutyl azelate; dihexyl azelate; and the like. Particularly preferred for a plasticizer, if present in the composition of layer 12, is Vikoflex 7170 plasticizer commercially available from ATOChem of Philadelphia, Pa.

Optionally, the composition for layer 412 comprises a stabilizer to aid in the formation of layer 412, provide ultraviolet resistance, and assist transfer to a durable, imaged substrate. Non-limiting examples of stabilizer include Hal-Lub, Hal-Base, Hal-Carb, Hal-Stab brand hindered amine light stabilizers commercially available from Hal-stab Company of Hammond, Ind.; Nuostabe V1923 brand ultraviolet light stabilizer commercially available from Witco of Greenwich, Conn.; Cosorb brand ultraviolet light stabilizer commercially available from 3M Company of St. Paul, Minn.; and Tinuvin brand HAL stabilizers commercially available from Ciba-Geigy Corp. of Greensboro, N.C. Particularly preferred for a stabilizer, if present in the composition of layer 12, is Tinuvin 1130 and Tinuvin 292 HAL stabilizers from Ciba-Geigy or Nuostabe V1923 stabilizer.

The layer 412 can have a composition ranging from about 40 to about 60 weight percent of vinyl chloride, from about 10 to about 30 weight percent acrylic resin, from about 0 to about 33 weight percent plasticizer, and from about 0 to about 10 weight percent stabilizer.

Desirably, layer 412 can have composition ranging from about 45 to about 55 weight percent of vinyl chloride, from about 15 to about 30 weight percent acrylic resin, from about 0 to about 20 weight percent plasticizer, and from about 0 to about 8 weight percent stabilizer.

Preferably, layer 412 can have composition ranging, from about 47 to about 60 weight percent of vinyl chloride, from about 16 to about 27 weight percent acrylic resin, from about 10 to about 21 weight percent plasticizer, and from about 2 to about 6 weight percent stabilizer.

Composition for layer 412 can be prepared by dissolving the ingredients into solvents such as ketones and aromatics, preferably Di-isobutyl ketone, mineral spirits, methyl ethyl ketone, methyl isobutyl ketone and toluene, more preferably in equal parts of such solvents. Layer 412 is knife or gravure coated on liner 414 with a dry coating weight ranging from about 0.70 to about 1.10 g to yield a dry thickness of from about 0.04 mm (0.0015 inches) to about 0.08 mm, (0.0030 inches). Preferably, liner 414 has a thickness ranging from about 0.5 mm (0.002 inches) to about 1 mm and layer 412 has a thickness ranging from about 0.5 mm (0.002 inches) to about 1 mm.

After coating, layer 412 is dried on liner 414 to remove solvents at a temperature ranging from about 90° C. to about 120° C. for about 2 minutes, then it is fused in an oven for 30 seconds to 60 seconds at 175° C.; 205° C. Composite 410 is then stored until usage, optionally, but preferably as a portion of a lamination with a field of pressure sensitive adhesive (PSA) and a second release liner protecting the PSA field.

Figure 15:
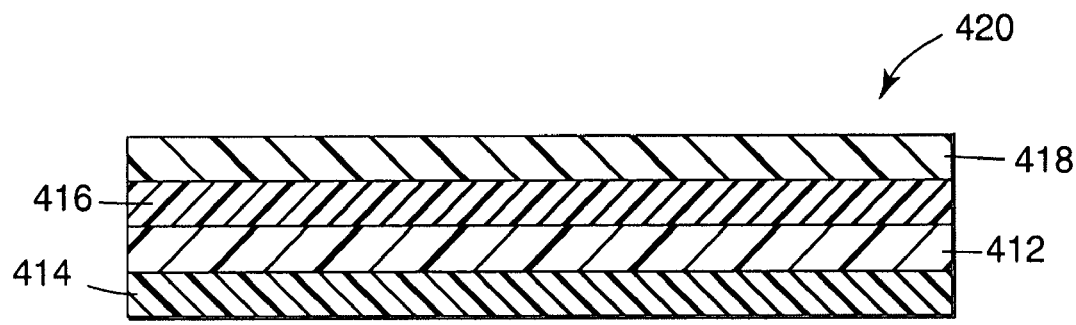
FIG. 15 illustrates a cross-sectional view of the durable, optically clear, transparent layer of the eleventh embodiment during a lamination step.

FIG. 15 illustrates a laminated composite 420, formed from the lamination of a PSA field 416 (protected by second release liner 418) laminated to a major surface of layer 412 opposite polymeric release liner 414.

Field 416 and liner 418 are combined in a separate step prior to lamination according to techniques well known to those skilled in the art.

Field 416 can be any conventional pressure sensitive adhesive that has optical clarity at least as good as and preferably better than the optical clarity properties of layer 412. Non-limiting examples of such adhesives include polyacrylates, polyvinylethers, natural rubber, silicone, rubber, styrene butadiene, cis-polybutadiene, styrene-isoprene block copolymers. Preferably, adhesives used include vinyl acrylic blends having a weight percent ratio ranging from about 50/50 to about 90/10 and preferably about 75/25 and a viscosity of 1100-1500 centipoise.

Field 416 can have a laminated thickness of from about 0.013 mm to about 0.05 mm, and preferably from about 0.015 to about 0.03 mm.

Release liner 418 can be made from a release liner material known to those skilled in the art. Preferably, the release liner material 418 has a surface roughness, measured according to Haggerty Sheffield of from about 5 to about 40 Sheffields. Selection of the liner 418 will affect the appearance of layer 412 and PSA field 16 during storage and prior to usage, which may be material to customer preference for the layer of the present invention. Non-limiting examples of release liners include silicone coated polyester, silicone coated paper, urea alkyd coated polyester, urea alkyd coated paper, and the like. Particularly preferred for release liner 418 is a silicone coated polyester commercially available from Rexam Release of Oak Brook, Ill. having a silicone coating of 0.005 mm caliper on a 0.07 mm polyester film.

Release liner 418 can have a gloss ranging from about 80 to about 130 and preferably from about 100 to about 130. Gloss is measured by a Gardner 60° Glossmeter using published techniques known to those skilled in the art such as ASTM Standard No. D523.

After lamination of PSA field 416 to layer 412, firs polymeric release liner 414 can be removed prior to storage and use.

Figure 16:
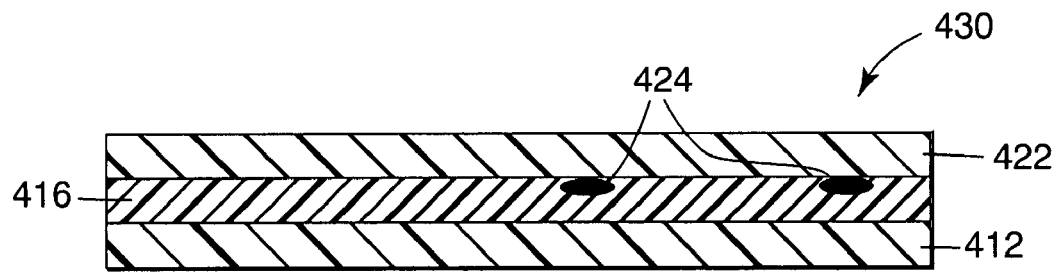
FIG. 16 illustrates a cross-sectional view of the durable, optically clear, transparent layer of the eleventh embodiment in combination with an imaged substrate.

FIG. 16 illustrates the cross-sectional appearance of final composite 430 composed of layer 412 having PSA field 416 adhered to a major surface thereof and also adhered to a substrate 422 having an image 424 on the major surface thereof to which field 416 is adhered. Layer 412 and PSA field 416 contact a major surface of substrate 422 without enveloping substrate 422. Preferably, substrate 422 has image 424 on one major surface and a field 424 of adhesive (not shown) on the opposing major surface. Image 424 is formed in accordance with the present invention.

Image 424 can comprise dyes, pigments, or combinations of both from toners, inks, or paints, all as known to those skilled in the art, in particular those described in embodiments of the present invention.

Preferably, image 424 comprises compositions capable of withstanding processing temperatures of at least about 100° C., and preferably at least about 105° C. This film surface is receptive to most inks, pigments, toners, dyes, and paints.

Substrate 422 can be any transparent substrate known to those skilled in the art of image graphics. Non-limiting examples include transparent glass, transparent acrylic sheets and transparent polycarbonate sheets. Substrate 422 may be the window of a building or vehicle.

Layer 412 and PSA field 416 are transferred from liner 418 on composite 420 to image 424 and substrate 422 by application of pressure of a range sufficient to adhere PSA field 416 to substrate 422 and preferably from about 1 kg to about 5 kg.

Layer 412 and PSA field 416 can have a combine caliper of from about 0.05 mm (0.002 inches) to about 0.13 mm when adhered to image 424 and substrate 422. Preferably, the caliper ranges from about 0.10 mm to about 0.13 mm.

After layer 412 and PSA field 416 are applied to image 424 and substrate 422, liner 18 can be removed, rolled, and can be recycled or later use.

Machinery conventionally used in the formation of durable imaged substrates can be used for the pressure sensitive transfer of layer 412 to substrate 422. Non-limiting examples of machinery include laminators such as Scotchprint™ 9540 and 9542 brand laminators from 3M Company.

Figure 17:
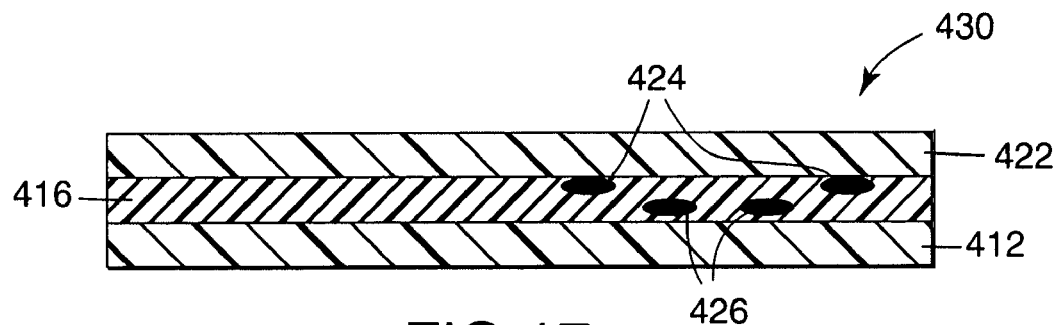
FIG. 17 illustrates a cross-sectional view of the durable, optically clear, transparent layer of the present invention in combination with an imaged substrate as a modification as a twelfth embodiment of the invention.

FIG. 17 illustrates a twelfth embodiment of the present invention where an image 426 is placed on layer 412 of composite 410 prior to adhering of PSA field 416. Transfer layer 412 and PSA field 416, with image 426 between layer 412 and PSA field 416, is adhered to a substrate 422 (with or without a second image 424 as seen in FIG. 17) to become final composite 430. In this embodiment, an electrostatic imaging transfer process can be used such as the Scotchprint™ Electronic Imaging system and electrostatic imaging paper, such as No. 8601 image transfer paper, both commercially available from Minnesota Mining and Manufacturing Co. St. Paul, USA, to place a 4-color design and silhouette pattern layer toner image from the electrostatic paper onto layer 412. Optionally, a PSA field 416 is adhered and the liner 414 is pealed away leaving image 426 on layer 412 for lamination transfer to a desirable durable film. Alternatively, any of the printing methods of the embodiments of the present invention, e.g. ink-jet or thermal transfer, may be used to print the image onto layer 412. Thermal mass transfer printing in accordance with the thirteenth embodiment is particularly preferred.

Use of layer 412 provides abrasion and ultraviolet light protection to image 424, image 426, or both, and substrate 422.

Abrasivity for layer 412 of the present invention before the image 424 wears away ranges from about 500 to about 2000 cycles with CS-10 abrasion wheels commercially available from Taber Industries of Tonowanda, N.Y. and preferably from about 500 to about 1000 cycles, depending the type of substrate used.

Layer 412 provides protection to image 424 and substrate 422 without detracting from the appearance of the image. Layer 418 is optically clear, transparent as determined by visual perception. Preferably, optical clarity gives acceptable vision when measured with a standard vision test with and without the film between one's eyes and the vision chart.

A protective clear layer was prepared on an area alkyd coated polyester having a urea polymer coating comprising a polyurea alkyd formulation of 0.005 mm caliper on a 0.07 mm polyester film from the following components.

46.7 weight percent Geon 178 vinyl resin (B.F. Goodrich, Cleveland, Ohio), 17.9 weight percent Elvacite acrylic resin (ICI Resins, Wilmington, Del.); 17.2 weight percent Vikoflex 7170 plasticizer (ATOChem, Philadelphia, Pa.); 2.3 weight percent Tinuvin 292 HAL stabilizer (Ciba-Geigy, Greensboro, N.C.); 2.3 weight percent Nuostabe V1923 stabilizer (Witco, Greenwich, Conn.) and 13.6 weight percent of a solvent system of two parts of di-isobutyl ketone and one part mineral spirits.

A layer was knife coated on the liner with a wet thickness of 0.127 mm and dried to remove solvents at a temperature of 120° C. for 2 minutes, and then fused in an oven for 45 seconds at 175° C. to a dry thickness of about 0.05 mm.

An adhesive was prepared from the following components:

| | |
|---|---|
| VYHH (Union Carbide, Danbury, CT) | 69 parts |
| Acryloid B82 (Rohm and Haas, Philadelphia, PA) | 17 parts |
| Paraplex G62 (C.P. Hall, BedFord Park, IL) | 14 parts |

The components were dissolved in a solvent mixture comprised of equal parts xylol, methyl ethyl ketone and methyl isobutyl ketone to yield a final solution viscosity of 1100-1600 centipoise. A field of solution was knife coated at 0.076 mm wet thickness on a silicone coated polyester release liner having a silicone coating of 0.005 mm caliper on a 0.07 mm polyester film (Rexam Release, Chicago, Ill.) and dried at 120° C. for 2 minutes to obtain a dry thickness of 0.0025 mm.

The layer on liner from Example 9 was then contacted to the adhesive field from Example 10 to produce the laminate as seen in FIG. 15, applying a pressure of about 2.3 Kg/cm².

In accordance with a thirteenth and particularly preferred embodiment of the present invention, the display device 20,21 of the present invention is a thermal transfer, including thermal mass transfer or sublimation printer. In thermal mass transfer printing a donor sheet or "ribbon" is placed in contact with a receptor sheet and the donor sheet is heated in an imagewise manner (usually from the back) by a localized thermal print head. The imagewise distribution of heat (and pressure, if necessary) causes an imagewise transfer of material from the donor sheet to the receptor sheet. The material transferred is usually a binder containing colorant (e.g. a dye, pigment or mixture of the two). The binder is a thermally softenable material (e.g. a wax or a resin), which releases from a carrier layer on the donor sheet and transfers and adheres to the receptor sheet. The thermal head typically consists of a matrix of minute heating elements, each of which can be addressed individually, normally with highly controlled pulses of current being passed through resistors which comprise the heating elements. Recently, large format thermal mass transfer printers have become commercially available with good local registration, e.g. the SummaChrome™ Imaging system (406 DPI) from Summagraphics Corporation, USA., or the GerberScientific Products/Gerber Edge Graphtec Corp. USA/GC 1300 system (400 DPI), or Roland Digital Group Color Camm PNC-5000 system (360 DPI). Such systems can be addressed directly by the computer 13 of the present invention.

Thermal sublimation printers differ from thermal mass transfer printers in that the donor ribbon does not contact the receptor sheet. The term "sublimation" refers to the fact that the colorant layer on the donor ribbon vaporizes and condenses onto the receptor sheet without going through an intermediate liquid state. By controlling the number of current pulses sent to each cell of the thermal printing head, the heat generated can be controlled which, in turn, determines the amount of sublimation and hence, the color density at that location. An example of a sublimation printer is the Rainbow™ series of printers supplied by Minnesota Mining and manufacturing Co., St. Paul, USA. These printers are typically small format.

Ribbons and printing methods for thermal transfer printing of light restricting including opaque silver metallic, white opaque and brilliant durable colors are known, for example, from U.S. Pat. Nos. 5,409,883 and 5,312,683 as well as U.S. Pat. No. 5,472,932 which are all incorporated herein by reference. The light restricting white and silver metallic ribbons known from U.S. Pat. Nos. 5,409,883 and 5,312,683 are preferred to print the light restricting light colored silhouette pattern 2 in registry with the colored image 3,4 of the present invention onto a suitable substrate. The optical density of the white light restricting layer should be at least 1, preferably at least 2, more preferably at least 2.5 and most preferably 3.

Extremely smooth, optically clear substrates having a very flat surface are preferred as the transfer process is sensitive to surface errors and the final sheeting should restrict vision as little as possible. The clear vinyl sheeting in accordance with the eleventh embodiment of the present invention is particularly preferred. Thermal transfer colorants used in thermal transfer ribbons are advantageous as commercially available ribbons provide UV light and moisture resistant images in full color.

For example, the SummaChrome™ Imaging system (406 DPI) from Summagraphics Corporation, USA includes a printer with eight stations for up to eight different ribbons each of which can be conveyed to the thermal printing head individually and in any order. Four of these ribbons may be the conventional black, magenta, yellow and cyan ribbons with four other ribbons being spot colors, in particular at least an light restricting light colored ribbon, such as metallic silver or white ribbons as mentioned above. Resin based ribbons are preferred as they provide good scratch resistant prints with good weatherability and durability. Trials with the SummaChrome™ Imaging system have demonstrated very good local registration between multiple layers of different colored ribbons (see Table 1) resulting in exact registration printing down to transparent area diameters of less than 1 mm.

The substrate for thermal transfer printing may be commercially available, clear, particularly optically clear films such as the transparent marking film VM 4414 from Minnesota Mining and Manufacturing Co., St. Paul, USA or commercially available optically clear polyester films. Particularly preferred are the optically clear vinyl films in accordance with the eleventh embodiment of the present invention. In order to give adequate mechanical stability to the vinyl film, it is preferably supplied in a laminate form with a polyester film with optional pressure sensitive adhesive between the vinyl and the polyester.

In accordance with the fourteenth to sixteenth embodiments of the present invention the TLD device 14 in accordance with the present invention may be a combination of direct printers 60, 70 or a combination of direct printer types in a printer 80.

The fourteenth to sixteenth embodiments of the present invention provide printed substrates of exceptional quality providing transparent areas 6 with optical clarity and free of printing aids and also colored images of the highest quality.

Figure 18:
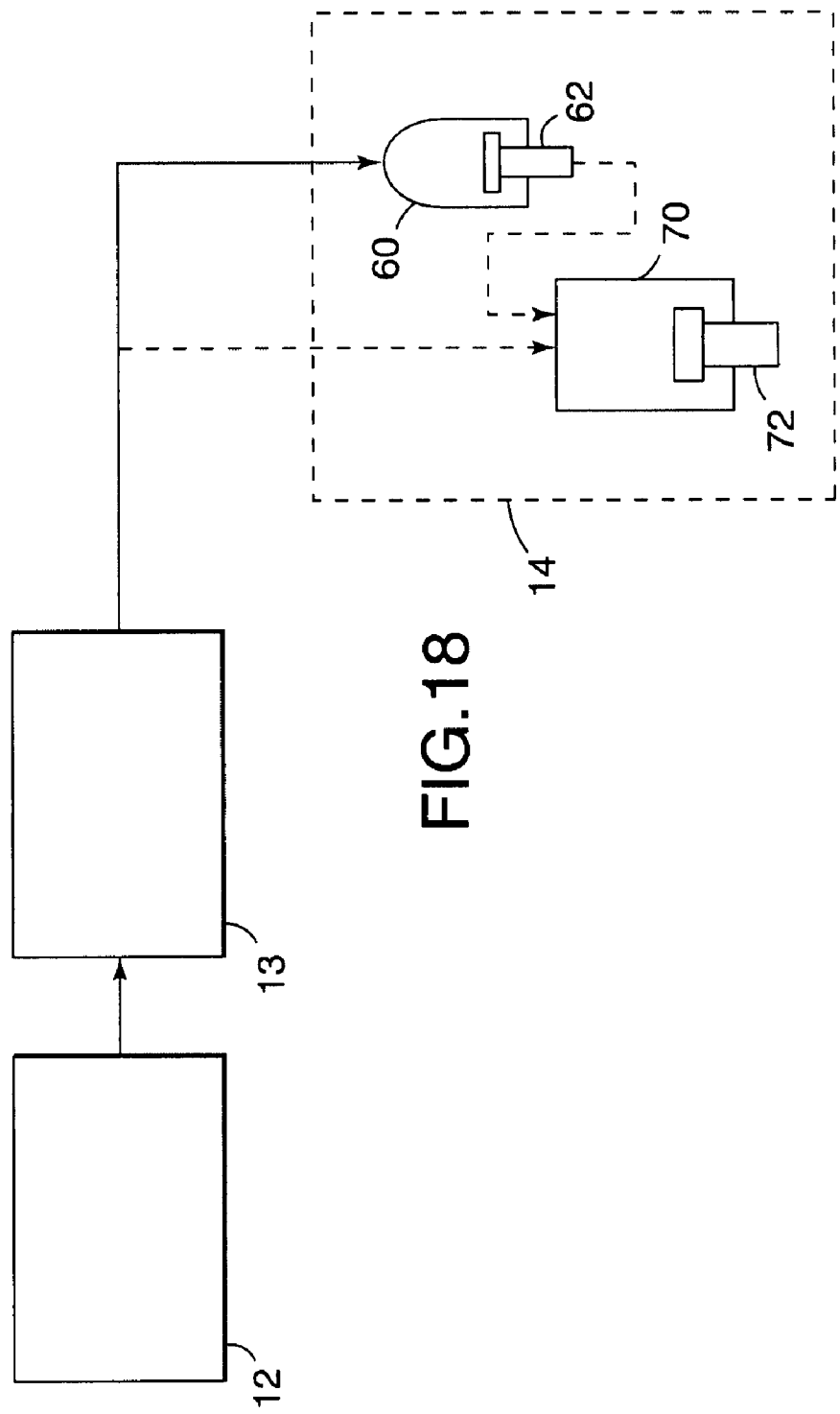
FIG. 18 is a block diagram of the components of a printing system in accordance with embodiments fourteen to sixteen of the present invention.

As shown schematically in FIG. 18, the output of computer 13 which includes both CMYK image data as well as T-layer data is supplied to printer 60 and optionally also to printer 70. Printer 60 is used to print a special silhouette pattern 2 onto a conformable, translucent or transparent, preferably optically clear substrate. The vinyl substrate of the eleventh embodiment is particularly preferred. The output print 62 from printer 60 is fed to printer 70 which may be a separate printer or a printing head integrated with the printing head of printer 60. The final full color image 3 including transparent areas 6 is produced by printer 80 as a final print 72.

Figure 19A:
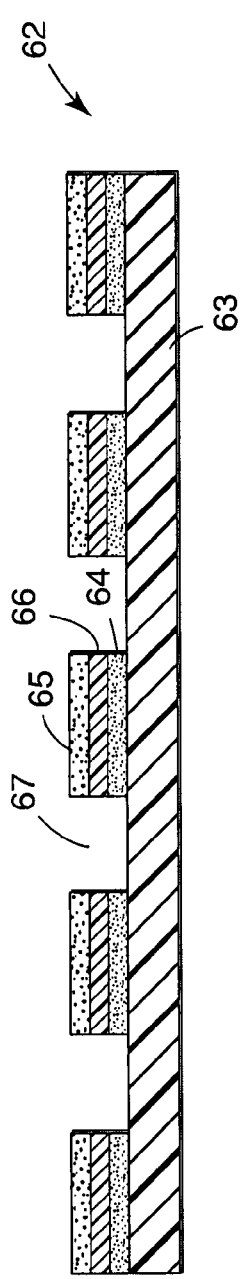
FIG. 19A is a cross-section and 19B is a top view of a printed substrate for use with embodiments fourteen to sixteen of the present invention.
Figure 19B:
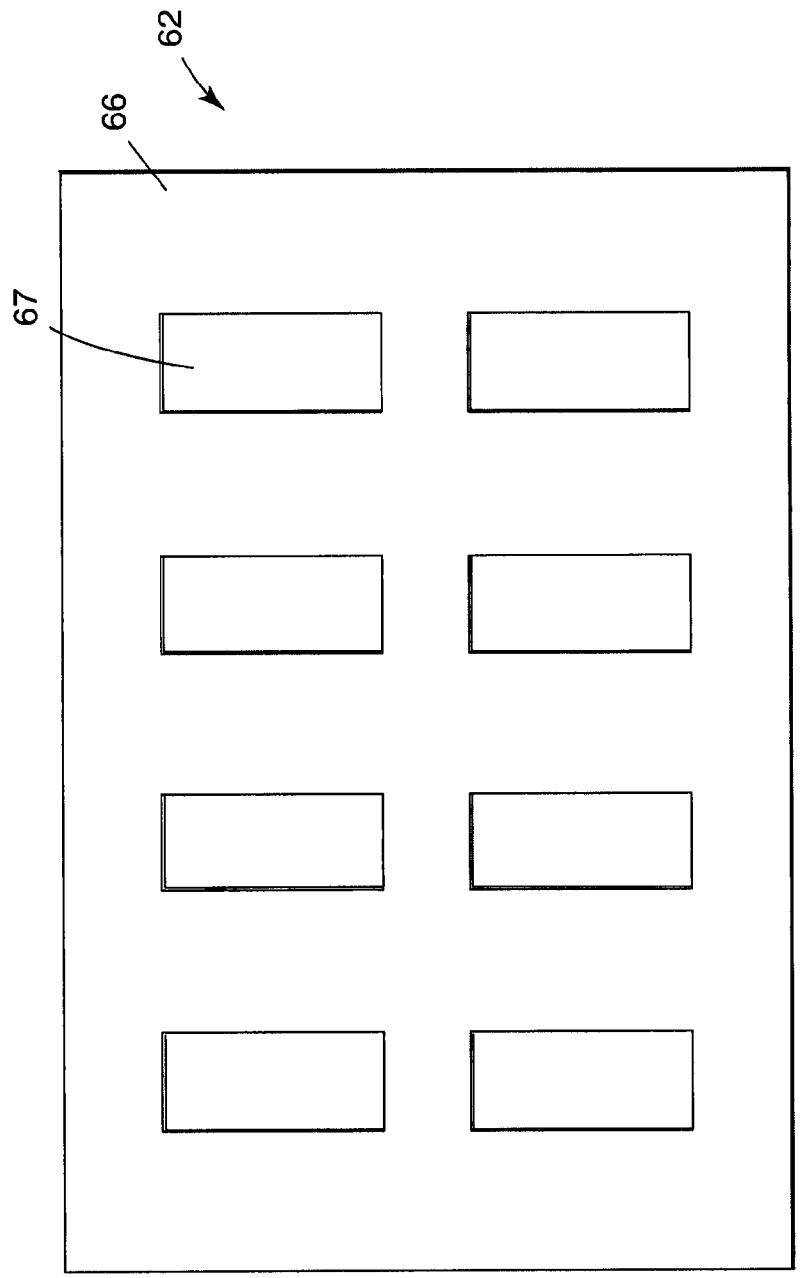

Referring to FIGS. 19A and 19B, the transparent substrate 63, which may be any of the translucent, transparent and/or optically clear substrates mentioned in the previous embodiments, particularly the optically clear, conformable substrate of the eleventh embodiment, is printed with layers 64 to 66 in registry leaving transparent areas 67 in accordance with the transparency data from the T layer. Printer 60 is preferably a thermal transfer printer as described with reference to the thirteenth embodiment. Layer 64 is a dark colored layer equivalent to layer 42 of FIG. 9 or 10. Layer 65 is a light colored silhouette layer and preferably has a transmission optical density of at least 1, preferably at least 2, more preferably at least 2.5 and most preferably at least 3. The white and metallic ribbons described in U.S. Pat. Nos. 5,312,683 and 5,409,883 are preferred. Layer 66 is a colorant receptor layer printed at the same time as layer 65 or printed as a separate layer.

Certain general principles about colorant receptor layers are described in U.S. Pat. No. 5,472,932. In accordance with the present invention, layer 66 may be an ink jet image receptor layer, for instance as described with reference to the seventh embodiment of the present invention including both a penetrant layer and an ink receiving layer. Alternatively, layer 66 may be the hygoscopic layer of the eighth embodiment and the substrate 63 may be the microporous layer of the same embodiment. Alternatively, layer 66 may be the conductive and dielectric layers of the tenth embodiment. Conductivity is maintained by providing a continuous path in layer 66 about the transparent areas 67 as best shown in FIG. 19B. The ribbons for printer 60 may be produced by embedding the particular type of colorant receptor layer in a suitable resin or wax.

As the colorant receptor layer 66 is placed in registry with the light colored layer 65, there is no need for layer 66 to be transparent. This has the advantage that receptor layer 66 may be better optimized for acceptance of the inks or toners. In particular the particle size limitations required in the ninth embodiment may be relaxed. For the conductive layer, the particle range may be extended to 0.02 to 10 μm. Also the surface roughness may be increased to 200 Sheffield units without affecting the clarity of the transparent areas 67.

The pigments, particles and other materials required for the colorant receptor layer 66 may be incorporated into a suitable binder for transferring to layer 65 by heat and pressure as is known for thermal transfer printing.

Printed substrate 62 may be transferred to a second printer 70. When printer 70 is an electrostatic printer, the substrate 62 may be printed directly in the printer 70 as described in the tenth embodiment of the present invention. Surprisingly, the transparent areas 67, which contain no dielectric and conductive layer, do not receive charge and do not take up toner. Hence, there is no need to provide printer 70 with the T layer data. This method of printing should be distinguished over European Patent No. EP 0234121 and U.S. Pat. No. B1 4,925, 705 in which a mask is used and subsequently removed. In accordance with this embodiment no mask is used.

Figure 20:
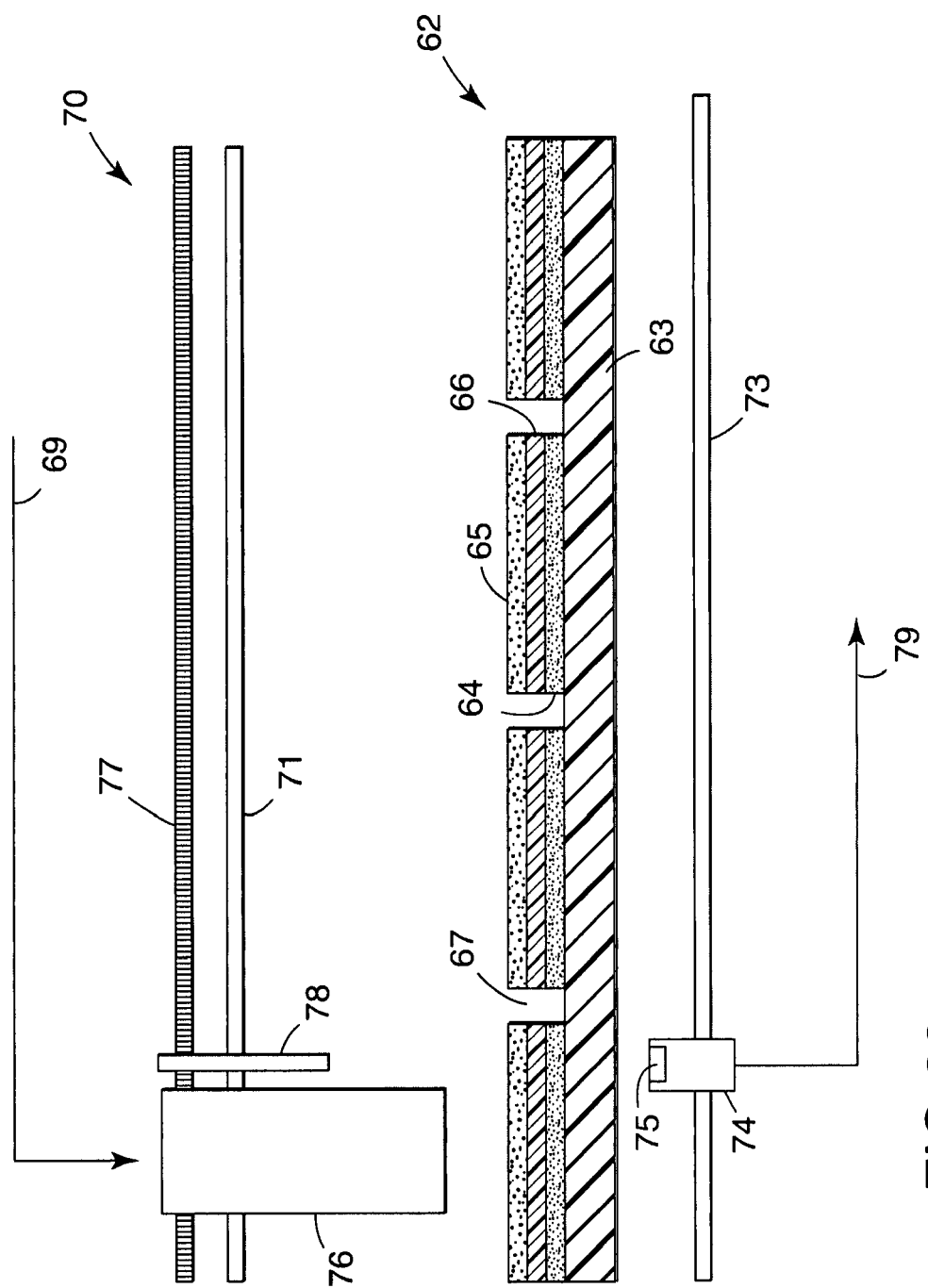
FIG. 20 is a schematic drawing of a printing head in accordance with the fifteenth embodiment of the present invention.

The fifteenth embodiment of the present invention will be described with reference to FIG. 20. Substrate 62 is prepared as described above whereby layer 66 is an ink jet ink receptor layer. The substrate 62 is printed in a modified ink jet printer 70. As shown in FIG. 20 the printer 70 may include a conventional four color ink jet printing head 76 which runs on a guide 71 across the width of the substrate 62. Associated with head 76 is a continuous tape having closely spaced registration marks. A sensor (not shown) in head 76 detects the marks on tape 77 and sends reference position data of the head 76 to the printer control circuit (not shown). Attached to the head 76 is a light source 78 which may be a laser and which provides a narrow beam of light directed substantially perpendicular to the substrate 62. On the other side of substrate 62 is mounted a head 74 on a further guide 73 head 74 is driven synchronously with head 76 by means of synchronized stepper motors or DC servomotors as is known in the art. Alternatively a mirror may be placed in the position of guide 73 and both head 74 and light source 78 may be mounted on the head 76. Head 74 includes a light sensor 75. When the light beam from light source 78 passes through transparent region 67 of substrate 62, the sensor 75 sends a signal 79 to the control circuit of the printer. The control circuit modifies the print signal 69 to head 76 so that printing is only carried out in registry with layers 63 to 66.

Figure 21:
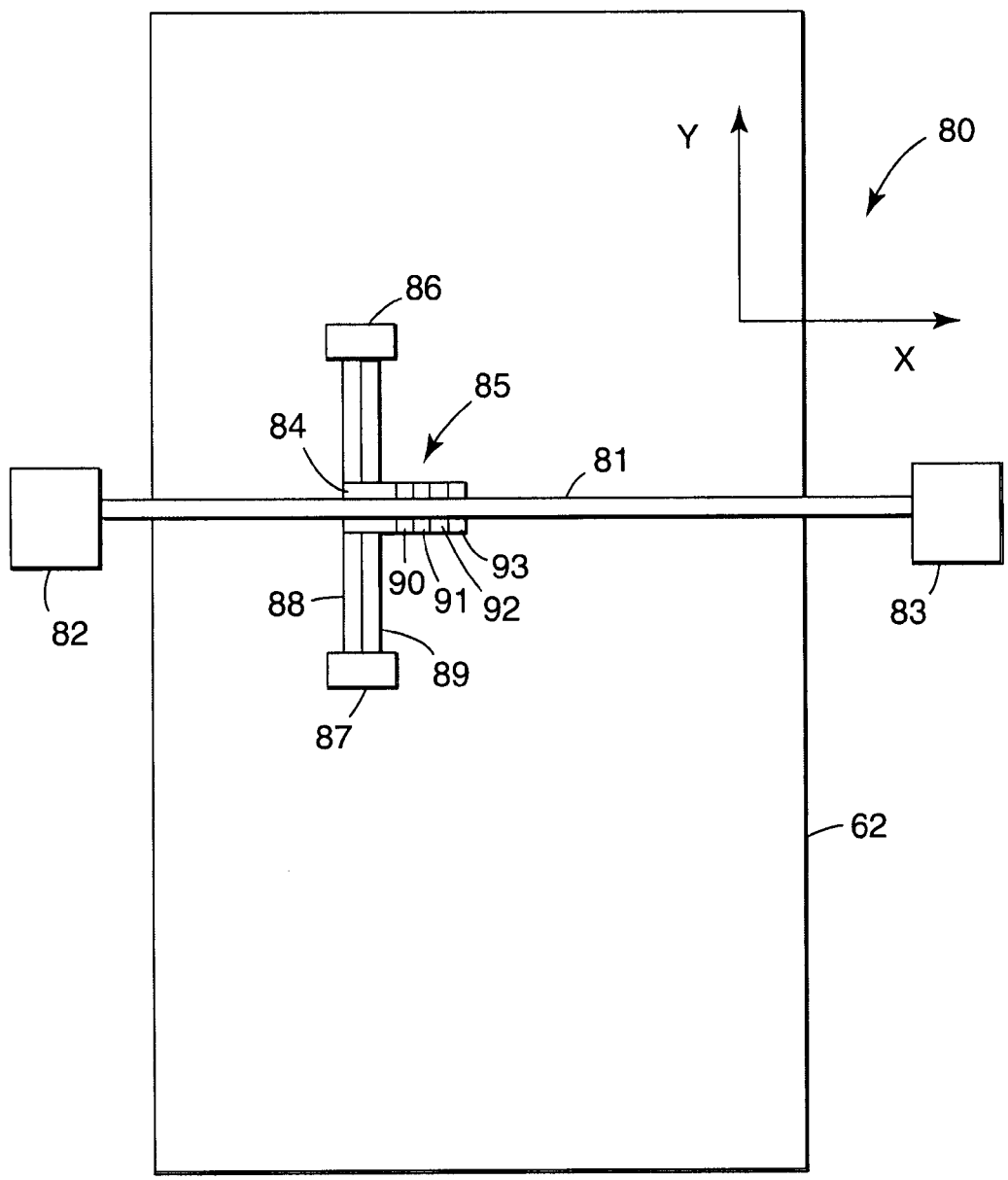
FIG. 21 is a schematic drawing of a printer in accordance with another embodiment of the present invention.

A sixteenth embodiment of the present invention will be described with reference to FIG. 21. Items with the same reference numbers are identical to those of the fourteenth and fifteenth embodiments. The printer 80 includes a thermal transfer printer 84, 86 to 89 and an ink jet printer 85, 90 to 93 combined in a single head. Thermal transfer printer 84,86 to 89 includes two or more ribbons, 88,89 which print layers 64 to 66 onto substrate 62. The ribbons are held in ribbon carriers 86,87. The thermal printer prints layers 64 to 66 on top of each other and in the width of one pass or the ink jet printer 85. Under control of the printer control circuit, the ink jet printer 85 then prints a full color image in registry with the patterned layers 64 to 66 using CMYK cartridges 90 to 93. The combined printing head may be mounted on a guide 81 supported by supports 82, 83 at each end and may traverse the width of substrate 62 as is conventional for ink jet printers. A registration mark tape such as 77 of FIG. 20 may be used to improve registry as is conventional in ink jet printers. Alternatively, the printing head may be stationary and the substrate 62 is moved in the X-Y directions by means of a known X-Y plotter drive.

As the ink jet printer does not print in areas where there are no layers 64 to 66, these areas do not require ink receptor layers. The transparent areas 67 may therefore be maintained optically clear.

While some embodiments of the invention have been described, the invention is not limited thereto. For example, various ways of identifying the invention include the following.

A method of displaying an image on a display device having first and second sides, said image including an light restricting silhouette pattern having a plurality of first transparent or translucent areas, and at least one design layer having at least one color, said at least one design layer being visible from one side of said display device and substantially less visible from the other side, said image being substantially transparent or translucent as viewed from the other side, comprises the steps:

1) providing at least a definition of said design layer to computer;

2) generating a computerized version of said design layer with the computer;

3) outputting the computerized version of said design layer to said display device, the computerized version of said design layer being modified to subdivide said design layer into a plurality of second discrete transparent or translucent areas and other areas, and 4) displaying said modified design layer and said silhouette pattern with said first and second transparent areas being in registry.

The method also can have a display device be an LCD display. The method can have the first step include providing a definition of a silhouette layer to the computer, the second include generating a computerized version of said silhouette layer, and the third step includes outputting the computerized versions of said silhouette layer and said design layer, the computerized version of said silhouette layer being modified to subdivide said silhouette layer into tire plurality of said first discrete transparent or translucent areas. The method can have third step include introducing the plurality of said second discrete transparent or translucent areas into said computerized version of said design layer using the computer. The method can have the third step include introducing the plurality of said first discrete transparent or translucent areas into said computerized verso in of said silhouette lacer using the computer. The method can have said display device be a printer. The method can have the printer be a direct or indirect printer. The method can have the printer be a local exact registry printer. The method can have the local registry index of the printer be smaller than 1 mm, preferably smaller than 0.6 mm and most preferably smaller than 0.4 mm. The method can have said computerized version of said design layer include data of color-separated layers of said design layer. The method can have said computerized versions of said design layer and said silhouette layer include data of said first transparent or translucent areas as separate transparency data. The method can have said display device be a transparent layer display device.

An article can have a conformable substrate and comprise: a colorant receptor layer and a light restricting layer on said substrate, said light restricting layer having a plurality of first transparent or translucent areas.

The article can have a conformable substrate, further comprising: said colorant layer having a plurality of second transparent or translucent areas, and said first transparent or translucent areas being in registry with second transparent or translucent areas. The article can have colorant receptor layer include a conductive layer suitable for electrostatic printing. The article can have said receptor layer include a dielectric layer suitable for electrostatic printing. The article can have said conductive layer include a conductive pigment comprising particles of antimony intimately mixed with tin oxide. The article can have the particles be antimony doped tin oxide. The article can have said conductive layer have a surface resistance ranging between $2.0 \times 10^5$ to about $3 \times 10^6$ Ohms/□. The article can have the dielectric layer comprise spacer particles and abrasive particles with the ratio of spacer particles to abrasive particles present within the range of about 1.5:1 to about 5:1. The article can have colorant receptor layer include a conductive layer suitable for electrostatic printing. The article can have said receptor layer include a dielectric layer suitable for electrostatic printing. The article can have said substrate be a vinyl-containing polymeric substrate. The article can have said colorant receptor layer include an ink receiving layer suitable for ink jet printing. The article can have said colorant receptor layer include an ink receiving layer suitable for ink jet printing. The article can have said substrate include a hydrophilic, microporous, polymeric membrane and said colorant receptor layer includes a hygroscopic layer. The article can have the pore structure of the membrane be collapsed to provide transparency by a post treatment after imaging such as heating or calendering. The article can further comprise a protective penetrant layer and said ink receiving layer containing dispersed particles of a size that causes protrusions from the protective layer. The article can comprise a protective penetrant layer and said ink receiving layer containing dispersed particles of a size that causes protrusions from the protective layer. The article can be durable. The article can have said substrate be transparent, preferably optically clear.

An article can comprise a polymeric substrate having a composition comprising vinyl chloride resin, optional acrylic resin, optional plasticizer, and optional stabilizer, wherein the composition is formed on a polymeric release liner having smoothness of a Sheffield value of from about 1 to about 10, and a light restricting layer and a design layer on said substrate, said design layer including at least one color layer, said light restricting layer being subdivided into a plurality of first transparent or translucent areas, said design layer being subdivided into a plurality of second transparent or translucent areas, and said first and second transparent areas being in registry.

The article can further comprise acrylic resin. The article can have the amount of vinyl chloride resin range from about 49 to about 712 weight percent; the amount of acrylic resin ranges from about 9 to about 33 weight percent; the amount of plasticizer ranges from about 0 to about 25 weight percent and wherein the stabilizer ranges from about 0 to about 8 weight percent. The article can have the amount of vinyl chloride resin range from about 55 to about 65 weight percent; the amount of acrylic resin ranges from about 16 to about 27 weight percent; and the composition includes an amount of plasticizer ranging from about 10 to about 16 weight percent; and an amount of stabilizer the ranging from about 2 to about 6 weight percent. The article can have said substrate be transparent, preferably optically clear.

A printer for receiving a print file includes color separated image data, light restricting layer data and transparency data, and for printing the color separated image and the light restricting layer data including transparent, areas in both the color-separated layer and the light restricting layer in accordance with the transparency data.

The printer can be an electrostatic printer, an ink jet printer, or a thermal transfer printer. The electrostatic printer can include a linear array of a plurality of separately chargeable electrodes, and said printer prints said transparency data by selectively controlling ones of the separately chargeable electrodes. The ink jet printer includes a plurality of ink jet heads and said printer prints said transparency data by selectively controlling ones of said ink jet heads. The thermal mass transfer printer can print said light restricting layer and a further print device to print said color separated image data.

A raster image processing method for raster image processing of a print file including color separated image data, light restricting layer data and transparency data, can comprise operating on said print file to generate raster image bitmaps for said color separated image data and said light restricting layer data, and introducing said transparency data into said raster image bitmaps for said color separated image data and said light restricting layer data so that the transparent areas in said color separated image raster bitmap and said light restricting layer bitmap are in registry.

The raster image processing method can have said color separated image raster bitmap and said light restricting layer bitmap are first created and then said transparent areas are introduced.

A raster image processing system for raster image processing of a print file including color separated image data, light restricting layer data and transparency data, comprises means operating on said print file to generate raster image bitmaps for said color separated image data and said light restricting layer data, and means introducing said transparency data into said raster image bitmaps for said color separated image data and said light restricting layer data so that the transparent areas in said color separated image raster bitmap and said light restricting layer bitmap are in registry.

The raster processing system can be hard-wired. The raster processing system can include a programmable digital processor.

Figure 22:
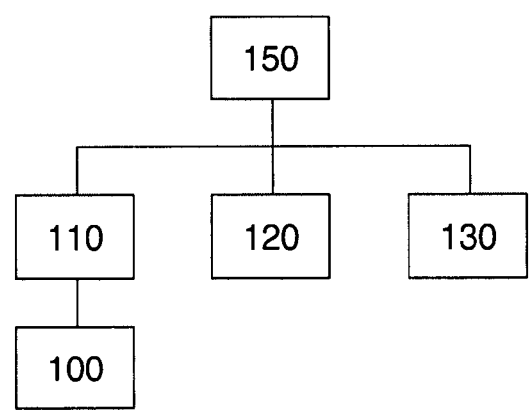
FIG. 22 shows a block diagram of a display system in accordance with the present invention.

A graphics computer based system, shown in schematic block diagram FIG. 22, for creating graphics images including color separated layers and light restricting layers, comprises first input means 100 for image data, means for generating color separated image data from said image data 110, means for generating light restricting layer data 120, second input means for transparency data 130, and means for outputting a display file including said color separated image data, said light restricting layer data and said transparency data 150.

The graphics computer based system can further comprise storage means for storing a plurality of standard transparency data templates.

The claims follow.

What is claimed is:

1. An article having a conformable substrate and comprising a colorant receptor layer and a light restricting layer on said substrate, said light restricting layer having a plurality of first transparent or translucent areas and a plurality of light restricting areas and a design layer on the substrate, the design layer including at least one color layer, the design layer being subdivided into a plurality of second transparent or translucent areas, and the first and second transparent or translucent areas being in registry.

2. The article of claim 1 wherein the light restricting layer has a transmission optical density or TOD of greater than 1.

3. The article of claim 1 wherein the light restricting layer has a transmission optical density or TOD of greater than 2.

4. The article of claim 1 wherein the light restricting layer has a transmission optical density or TOD of greater than 3.

5. The article of claim 1 wherein the transparent or translucent areas are optically clear.

6. The article of claim 1 wherein the colorant receptor is an ink-jet ink receptor.

7. The article of claim 1 wherein the colorant receptor is a non-porous hygroscopic layer.

8. The article of claim 1 comprising a hydrophilic, microporous, polymeric membrane.

9. The article of claim 1 wherein the colorant receptor layer is transparent.

10. A display unit comprising the article of claim 1.

11. A raster image processing method for raster image processing of a print file including color separated image data, light restricting layer data and transparency data, comprising operating on said print file to generate raster data, and introducing said transparency data into said raster image bitmaps for said color separated image data and said light restricting layer data so that the transparent areas in said color separated image raster bitmap and said light restricting layer bitmap are in registry to form the article of claim 1.

12. An article having a conformable substrate and comprising a colorant receptor layer and a light restricting layer on said substrate, said light restricting layer having a plurality of first transparent or translucent areas and a plurality of light restricting areas, the colorant receptor layer is in registry with the light restricting areas.

13. The article of claim 12 comprising a design layer on the substrate, the design layer including at least one color layer, the design layer being subdivided into a plurality of second transparent or translucent areas, and the first and second transparent or translucent areas being in registry.

14. The article of claim 12 wherein the light restricting layer has a transmission optical density or TOD of greater than 1.

15. The article of claim 12 wherein the colorant receptor is an ink-jet ink receptor.

16. The article of claim 12 wherein the colorant receptor is a non-porous hygroscopic layer.

17. The article of claim 12 wherein the colorant receptor layer is transparent.

18. A display unit comprising the article of claim 12.

19. An article having a conformable substrate and comprising a colorant receptor layer and a light restricting layer on said substrate, said light restricting layer having a plurality of first transparent or translucent areas and a plurality of light restricting areas, and an adhesive layer on the article opposite the colorant receptor layer.

20. The article of claim 19 comprising a design layer on the substrate, the design layer including at least one color layer, the design layer being subdivided into a plurality of second transparent or translucent areas, and the first and second transparent or translucent areas being in registry.

21. The article of claim 19 wherein the light restricting layer has a transmission optical density or TOD of greater than 1.

22. The article of claim 19 wherein the colorant receptor is an ink-jet ink receptor.

23. The article of claim 19 wherein the colorant receptor layer is transparent.

24. A display unit comprising the article of claim 19.

25. An article having a conformable substrate and comprising a colorant receptor layer and a light restricting layer on said substrate, said light restricting layer having a plurality of first transparent or translucent areas and a plurality of light restricting areas, and an adhesive layer on the article adjacent to the colorant receptor layer.

26. The article of claim 25 comprising a design layer on the substrate, the design layer including at least one color layer, the design layer being subdivided into a plurality of second transparent or translucent areas, and the first and second transparent or translucent areas being in registry.

27. The article of claim 25 wherein the light restricting layer has a transmission optical density or TOD of greater than 1.

28. The article of claim 25 wherein the colorant receptor is an ink-jet ink receptor.

29. A display unit comprising the article of claim 25.

* * * * *

UNITED STATES PATENT AND TRADEMARK OFFICE
CERTIFICATE OF CORRECTION

| | | |
|---|---|---|
| PATENT NO. | : 7,791,562 B2 | Page 1 of 5 |
| APPLICATION NO. | : 11/704813 | |
| DATED | : September 7, 2010 | |
| INVENTOR(S) | : Bruno Mueller | |

It is certified that error appears in the above-identified patent and that said Letters Patent is hereby corrected as shown below:

Column 4
Line 36, After "view" delete "of a".

Line 67, Delete "invention.;" and insert in place thereof -- invention. --.

Column 7
Line 7, Delete "lanes," and insert in place thereof -- lines, --.

Line 9, Delete "areas," and insert in place thereof -- areas --.

Column 8
Line 51, Delete "final," and insert in place thereof -- final --.

Line 54, Delete "users" and insert in place thereof -- used --.

Lines 57-58, Delete "deactivating" and insert in place thereof -- de-activating --.

Line 64, Delete "clot" and insert in place thereof -- dot --.

Column 9
Line 13, Delete "which," and insert in place thereof -- which --.

Line 24, Delete "a;" and insert in place thereof -- as --.

Line 61, Delete "3 5," and insert in place thereof -- 3, 5, --.

Column 10
Line 36, Delete "undercolor," and insert in place thereof -- undercolor --.

Signed and Sealed this
Eighth Day of May, 2012

David J. Kappos
*Director of the United States Patent and Trademark Office*

Column 11
Lines 44-45, Delete "international" and insert in place thereof -- International --.

Column 13
Line 3, Delete "relay" and insert in place thereof -- may --.

Line 49, Delete "patterns" and insert in place thereof -- pattern, --.

Line 53, Delete "missregistration" and insert in place thereof -- misregistration --.

Lines 54-55, Delete "missregistration" and insert in place thereof -- misregistration --.

Column 14
Line 11, Delete "Mortsel" and insert in place thereof -- Mortsel, --.

Line 46, Delete "is," and insert in place thereof -- is --.

Line 64, Delete "water" and insert in place thereof -- water, --.

Column 15
Line 7, Delete "urea" and insert in place thereof -- area --.

Line 35, Delete "value" and insert in place thereof -- value, --.

Line 44, Delete "missregistration" and insert in place thereof -- misregistration --.

Column 16
Line 7 (Approx.), Delete "Hewlet" and insert in place thereof -- Hewlett --.

Column 17
Line 26, Delete "tills" and insert in place thereof -- this --.

Line 31, Delete "therein" and insert in place thereof -- herein --.

Line 59, Delete "Mining," and insert in place thereof -- Mining --.

Column 18
Line 14, Delete "4,732,808," and insert in place thereof -- 4,732,808; --.

Line 31 -32, Delete "coatings" and insert in place thereof -- coating --.

Column 19
Line 15, Delete "the" and insert in place thereof -- these --.

Line 22, Delete "feasibly." and insert in place thereof -- feasible. --.

Line 20
Line 36, Delete "ink" and insert in place thereof -- ink, --.

Line 23
Line 10, After "having" insert -- attorney docket number 52146USA4A, --.

Line 40, Delete "layers" and insert in place thereof -- layer --.

Column 24
Line 7, Delete "irk" and insert in place thereof -- ink --.

Line 21, Delete "cracking," and insert in place thereof -- cracking --.

Line 60, Delete "polymer" and insert in place thereof -- polymeric --.

Column 25
Line 26, Delete "sheet," and insert in place thereof -- sheet --.

Line 43 (Approx.), Delete "of," and insert in place thereof -- of --.

Column 26
Line 61, Delete "east" and insert in place thereof -- least --.

Column 27
Line 52, Delete "nips" and insert in place thereof -- nibs --.

Column 29
Line 35, Delete "particle," and insert in place thereof -- particles --.

Column 30
Line 36 (Approx.), Delete "(Yoshizumi)," and insert in place thereof -- (Yoshizumi); --.

Column 32
Line 6, Delete "present;" and insert in place thereof -- present --.

Line 14, Delete "mired" and insert in place thereof -- mined --.

Line 18, Delete "rind" and insert in place thereof -- and --.

Column 33
Line 36, Delete "pr sent" and insert in place thereof -- present --.

Column 34
Line 66, Delete "she" and insert in place thereof -- the --.

Column 36
Line 12, Delete "Elavacite" and insert in place thereof -- Elvacite --.

Column 37
Line 2, Delete "C.;" and insert in place thereof -- C. to --.

Line 45, Delete "firs" and insert in place thereof -- first --.

Column 38
Line 8, Delete "combine" and insert in place thereof -- combined --.

Line 15 (Approx.), Delete "or" and insert in place thereof -- for --.

Line 48, Delete "Tonowanda," and insert in place thereof -- Tonawanda --.

Line 63, Delete "Ohio)," and insert in place thereof -- Ohio); --.

Column 39
Line 14 (Approx.), Delete "BedFord" and insert in place thereof -- Bedford --.

Line 52, Delete "Color Camm" and insert in place thereof -- ColorCamm --.

Column 41
Line 13, Delete "2.5" and insert in place thereof -- 2, 5 --.

Line 24, Delete "hygoscopic" and insert in place thereof -- hygroscopic --.

Column 42
Line 4, Delete "73" and insert in place thereof -- 73. --.

Line 4, Delete "head" and insert in place thereof -- Head --.

Line 52, After "to" insert -- a --.

Column 43
Line 4, Delete "tire" and insert in place thereof -- the --.

Line 11 (Approx.), Delete "verso in" and insert in place thereof -- version --.

Line 11 (Approx.), Delete "lacer" and insert in place thereof -- layer --.

Column 44
Line 15, Delete "712" and insert in place thereof -- 72 --.

Line 17, Delete "percent" and insert in place thereof -- percent; --.

Line 30, Delete "transparent," and insert in place thereof -- transparent --.